(12) United States Patent
Rave

(10) Patent No.: US 8,412,260 B2
(45) Date of Patent: Apr. 2, 2013

(54) METHOD AND SYSTEM FOR DATA COMMUNICATION

(75) Inventor: Wolfgang Rave, Freital-Pesterwitz (DE)

(73) Assignee: Vodafone Holding GmbH, Düsseldorf (DE)

( * ) Notice: Subject to any disclaimer, the term of this patent is extended or adjusted under 35 U.S.C. 154(b) by 983 days.

(21) Appl. No.: 12/436,565

(22) Filed: May 6, 2009

(65) Prior Publication Data

US 2009/0279442 A1 Nov. 12, 2009

(30) Foreign Application Priority Data

May 9, 2008 (EP) .................. 08008747

(51) Int. Cl.
H04L 12/26 (2006.01)

(52) U.S. Cl. ........ 455/524; 370/138; 370/142; 370/340; 370/350; 706/12

(58) Field of Classification Search .......... 455/524
See application file for complete search history.

(56) References Cited

U.S. PATENT DOCUMENTS

| | | | |
|---|---|---|---|
| 6,426,978 B1 * | 7/2002 | Bottomley et al. | 375/265 |
| 6,771,688 B1 * | 8/2004 | Lee et al. | 375/142 |
| 6,775,260 B1 * | 8/2004 | Dabak et al. | 370/342 |
| 6,985,545 B2 * | 1/2006 | Teo et al. | 375/349 |
| 7,154,936 B2 * | 12/2006 | Bjerke et al. | 375/148 |
| 7,215,704 B2 * | 5/2007 | Fujii et al. | 375/232 |
| 7,263,376 B2 * | 8/2007 | Bohnhoff | 455/502 |
| 7,336,930 B2 * | 2/2008 | Larsson et al. | 455/63.1 |
| 7,370,332 B2 * | 5/2008 | Kutz et al. | 714/780 |
| 7,373,128 B2 * | 5/2008 | Dowling | 455/296 |
| 7,430,257 B1 * | 9/2008 | Shattil | 375/347 |
| 7,433,390 B2 * | 10/2008 | Hepler et al. | 375/150 |
| 7,447,285 B2 * | 11/2008 | Matsumoto et al. | 375/346 |
| 7,466,773 B2 * | 12/2008 | Hansen et al. | 375/341 |
| 7,486,726 B2 * | 2/2009 | Alexander et al. | 375/232 |
| 7,496,128 B2 * | 2/2009 | Giannakis et al. | 375/138 |
| 7,519,898 B2 * | 4/2009 | Narayanan et al. | 714/801 |
| 7,526,037 B2 * | 4/2009 | Hoo | 375/267 |
| 7,593,449 B2 * | 9/2009 | Shattil | 375/130 |
| 7,593,742 B2 * | 9/2009 | Bohnhoff | 455/502 |
| 7,613,233 B2 * | 11/2009 | Hottinen | 375/219 |
| 7,688,777 B2 * | 3/2010 | Liberti et al. | 370/328 |
| 7,701,916 B2 * | 4/2010 | Dabak et al. | 370/342 |
| 7,701,917 B2 * | 4/2010 | Mantravadi et al. | 370/343 |
| 7,706,477 B2 * | 4/2010 | Larsson | 375/340 |
| 7,782,889 B2 * | 8/2010 | Kozek et al. | 370/431 |
| 7,912,014 B2 * | 3/2011 | Molisch et al. | 370/334 |
| 7,924,949 B2 * | 4/2011 | Larsson | 375/340 |
| 7,978,635 B2 * | 7/2011 | Tsai et al. | 370/282 |
| 2002/0065664 A1 * | 5/2002 | Witzgall et al. | 704/500 |
| 2002/0118784 A1 * | 8/2002 | Teo et al. | 375/349 |
| 2003/0214917 A1 * | 11/2003 | Molisch et al. | 370/286 |
| 2004/0062302 A1 * | 4/2004 | Fujii et al. | 375/232 |
| 2004/0264561 A1 * | 12/2004 | Alexander et al. | 375/232 |
| 2005/0071726 A1 * | 3/2005 | Kutz et al. | 714/755 |
| 2005/0176436 A1 * | 8/2005 | Mantravadi et al. | 455/450 |
| 2005/0185739 A1 * | 8/2005 | Hansen et al. | 375/340 |

(Continued)

*Primary Examiner* — Hai Nguyen

(74) *Attorney, Agent, or Firm* — International IP Law Group, PLLC

(57) ABSTRACT

There is provided a system and method for multi-user detection by a plurality of base stations situated at different geographical locations through base station cooperation. An exemplary method comprises exchanging detected data iteratively while performing separate detection and decoding of received data streams.

16 Claims, 17 Drawing Sheets

U.S. PATENT DOCUMENTS

| | | | |
|---|---|---|---|
| 2005/0229091 A1* | 10/2005 | Narayanan et al. | 714/801 |
| 2005/0260947 A1* | 11/2005 | Karabinis et al. | 455/12.1 |
| 2006/0209993 A1* | 9/2006 | Lu | 375/336 |
| 2007/0054621 A1* | 3/2007 | Larsson | 455/67.11 |
| 2007/0116143 A1* | 5/2007 | Bjerke et al. | 375/262 |
| 2007/0293255 A1* | 12/2007 | Bohnhoff | 455/502 |
| 2008/0232394 A1* | 9/2008 | Kozek et al. | 370/465 |
| 2008/0232403 A1* | 9/2008 | Tsai et al. | 370/473 |
| 2008/0317150 A1* | 12/2008 | Alexander et al. | 375/260 |
| 2009/0060078 A1* | 3/2009 | van Zelst et al. | 375/262 |
| 2009/0131009 A1* | 5/2009 | Hepler et al. | 455/334 |
| 2009/0185521 A1* | 7/2009 | Li et al. | 370/315 |
| 2009/0290667 A1* | 11/2009 | McElwain | 375/350 |
| 2009/0310651 A1* | 12/2009 | Amde et al. | 375/147 |
| 2009/0325497 A1* | 12/2009 | Bohnhoff | 455/65 |
| 2010/0098014 A1* | 4/2010 | Larsson | 370/329 |
| 2010/0166118 A1* | 7/2010 | Mantravadi et al. | 375/340 |
| 2010/0299287 A1* | 11/2010 | Cao et al. | 706/12 |
| 2011/0222627 A1* | 9/2011 | Prakash et al. | 375/295 |
| 2011/0255623 A1* | 10/2011 | Golitschek Edler Von Elbwart et al. | 375/261 |
| 2011/0275364 A1* | 11/2011 | Austin et al. | 455/423 |
| 2011/0292811 A1* | 12/2011 | Tsai et al. | 370/241 |

\* cited by examiner

METHOD AND SYSTEM FOR DATA COMMUNICATION

CROSS REFERENCE TO RELATED APPLICATION

This application claims priority to European (EP) Patent Application No. 08008747.1, filed on May 9, 2008, the contents of which are incorporated by reference as if set forth in their entirety herein.

BACKGROUND

A long felt desire in the communication, especially the multi media technology is to encounter a need for higher spectral efficiency in wireless systems.

One principal line of thought to address the OCI problem was initiated by Wyner's treatment of base station cooperation in a simple and analytically tractable model of cellular systems [11]. In this model, cells are arranged in either an infinite linear array or in some two-dimensional pattern, with interference originating only from the immediate neighboring cells (having a common edge). All the processing is performed at a single central point. Subsequent work on the information theoretic capacity of the centralized processing systems concluded that the achievable rate per user significantly exceeds that of a conventional cellular system [12,13].

Recently, decentralized detection using the belief propagation algorithm for a simple one-dimensional Wyner model was proposed in [14]. The belief propagation algorithm effectively exchanges the estimates for all signals received at each BS, by alternately exchanging likelihood values and extrinsic information. This idea was extended to 2D cellular systems in [15-17], where the limits compared to MAP decoding were studied, showing the great potential of BS cooperation with decentralized processing (at least for regular situations). Unfortunately, for a star network (commonly used today) interconnecting the BSs, this results in a huge back-haul traffic.

Another approach to convert situations where cochannel users interfere each other with comparably strong signals into an advantage for a high-frequency reuse cellular system was proposed in [18]: different BSs cooperate by sending quantized baseband signals to a single central point for joint detection and decoding. Such a distributed antenna system (DAS) not only reduces the aggregate transmitted power, but also results in much improved received SINR [19]. Using 3 appropriate receive strategies, both array and diversity gains are obtained, resulting in a substantial increase in system capacity [20, 21]. The DAS scheme, however, is less attractive for network operators due to the large amount of backhaul it requires and the cooperative scheduling necessary between the adjacent DAS units in order to avoid interference. Here, backhaul is defined as the additional communication link between different cooperating entities. Although the bandwidth of wired links used for backhaul can be very high, they are usually owned by a third party, making it attractive for the cellular system operators to reduce the backhaul in order to minimize operating costs. The influence of limited back-haul on capacity in DAS has been investigated in [22, 23].

SUMMARY OF THE INVENTION

An exemplary embodiment of the present invention relates to a method and a system for multi-user detection.

Moreover, exemplary embodiments of the present invention may relate to a method, a system and a communication device for processing data for transmission in a wireless communication system using for multi-user detection through base station cooperation.

Exemplary embodiments of the present invention may employ advanced receiver techniques for uplink communication. However, exemplary embodiments of the present invention are not limited to this case and may also relate to a down link communication.

Therefore, an exemplary embodiment of the present invention may allow for a more reliable and/or flexible method for multi-user detection through base station cooperation.

An exemplary embodiment of the present invention relates to a method for multi-user detection through base station cooperation. This method may be characterized in, that the base stations are situated at different geographical locations and that the base stations exchange detected data iteratively while performing separate detection and decoding of their received data streams.

Moreover, an exemplary embodiment of the present invention may provide the advantage that resulting backhaul traffic is considerably lower than that of existing cooperative multi-user detection strategies.

An exemplary embodiment of the present invention deals with multi-user detection through base station cooperation in an uplink, interference-limited, high frequency reuse scenario. Distributed iterative detection (DID) is an interference mitigation technique in which the base stations at different geographical locations exchange detected data iteratively while performing separate detection and decoding of their received data streams.

Exemplary embodiments of the present invention utilize DID receive strategies and proposes to exchange between base stations especially, preferably only the processed information for their associated mobile terminals. The resulting backhaul traffic is considerably lower than that of existing cooperative multi-user detection strategies.

Within further preferred exemplary embodiments of the invention, single-antenna interference cancellation techniques are employed to generate local estimates of the dominant interferers at each base station, which are then combined with their independent received copies from other base stations, resulting in more effective interference suppression.

A higher-frequency reuse is therefore proposed, resulting in the interference from cochannel users outside the cells to dominate, thereby forming a single most important factor limiting the system performance. This interference coming from outside the cell boundaries is commonly referred to as other cell interference (OCI). OCI has been treated in [1], where it was suggested that advanced receiver and transmitter techniques can be employed in the uplink and downlink of a cellular system, respectively. Given that the mobile terminals (MTs) are low-cost, low-power independent entities, and are not expected to cooperate to perform transmit or receive beamforming, they are assumed to be as simple as possible with most of the complex processing of a cellular system moved to the base stations (BSs).

An exemplary embodiment of the invention proposes to exchange between base stations mainly the processed information for their associated mobile terminals.

According to a preferred exemplary embodiment of the method, the communication system, the logical node and the mobile user equipment, it is proposed to exchange between base stations only the processed information for their associated mobile terminals.

An exemplary embodiment of the invention may further include, that local estimates of the dominant interferers of at least two base stations are calculated This exemplary embodiment of the invention may provide several advantages. For example, it may result in more effective interference suppression.

It is especially useful to use many, most or even all of these local estimates in order to improve the performance.

The usage of the local estimates of the dominant interferers may result in an even more effective interference suppression.

According to a preferred exemplary embodiment of the method, the communication system, the logical node and the mobile user equipment, local estimates of the dominant interferers of most base stations, are generated, wherein the local estimates are then combined with their independent received copies from other base stations.

According to a preferred exemplary embodiment of the method, the communication system, the logical node and the mobile user equipment, at least some of the local estimates are combined with their independent received copies from other base stations.

According to an exemplary embodiment of the invention, most of the local estimates are combined with their independent received copies from other base stations.

According to one exemplary embodiment of the invention, all of the local estimates are combined with their independent received copies from other base stations, According to a preferred exemplary embodiment of the method, the communication system, the logical node and the mobile user equipment, single-antenna interference cancellation techniques are employed to generate the local estimates of the dominant interferers at each base station.

If hard information bits or quantized log-likelihood ratios (LLRs) are transferred, it is preferred to investigate the effect of quantization of the LLR values with the objective of further reducing the backhaul traffic.

Schemes based on nonuniform quantization of the "soft bits" may allow for reducing the backhaul to 1-2 exchanged bits/coded bit.

The exchange of soft bits minimizes the backhaul traffic.

It is especially advantageous to detect a bit as a soft bit, which has more than 2 levels, for example, from 0 to 15 for a four-bit digital number. In this 16-level example, the level 15 of the soft bit is a very strong 1 and level 8 of the soft bit is a very weak 1. Similarly, the level 7 of the soft bit is a very weak 0 and the level 0 of the soft bit is a very strong 0.

If nonuniformly quantized soft bits are exchanged to minimize the backhaul traffic, the quantization of reliability information does not result in a pronounced performance loss and sometimes even hard bits can be exchanged without undue degradation.

For further reducing backhaul it is further proposed that only those bits that have changed signs between iterations be exchanged. The result is a considerable reduction in backhaul traffic between base stations.

In order to improve a functionality of communication system it is preferred, that it employs the capability for carrying out at least one part of the method steps explained in the current application.

It is furthermore advantageous, that also the logical node and/or the mobile user equipment employ the capability of carrying out the method or at least some steps for integrating the method.

According to a preferred exemplary embodiment of the method, the communication system, the logical node and the mobile user equipment, asymmetric multi-user detection is realized.

Preferably. it is utilized that the resource management of the cellular network can detect (e.g., via signal strength indicators) groups of MTs that are strongly received at several base stations. Advantageous embodiment of the invention especially relate to a decentralized implementation. To this end, the concept of distributed iterative detection (DID) was introduced in [24, 25]: each base station initially performs single-user detection for the strongest MT, treating the signals received from all other mobile terminals as noise. The information that becomes available at the decoder output is then sent to neighboring BS while mutually receiving data from its own neighbors in order to reconstruct and cancel the interference of its own received signal. This leads to interference-reduced signals.

According to a preferred exemplary embodiment of the method, the communication system, the logical node and the mobile user equipment. single-user detection is applied to interference-reduced signal by applying parallel interference cancellation. Further improvements can be achieved by repeated application of this procedure.

In respect to conventional single-user. the detection in different scenarios can be improved by varying the strength of the user coupling through the channel.

An exemplary embodiment of the present invention includes further improvement with respect to conventional single-user detection in different scenarios with varying strength of the user coupling through a channel.

A significant additional gain is possible if the single-user detection step in the 0th iteration with single-antenna interference cancellation (SAIC) implemented as joint maximum likelihood detection (JMLD) in the symbol detector acting as the receiver front-end.

Furthermore. a significant tradeoff between the amount of information exchanged and improvement beyond a single-user detection is realized.

BRIEF DESCRIPTION OF THE DRAWINGS

Reference will be made by way of example to the accompanying drawings in which.

DETAILED DESCRIPTION OF SPECIFIC EMBODIMENTS

Figure 1:
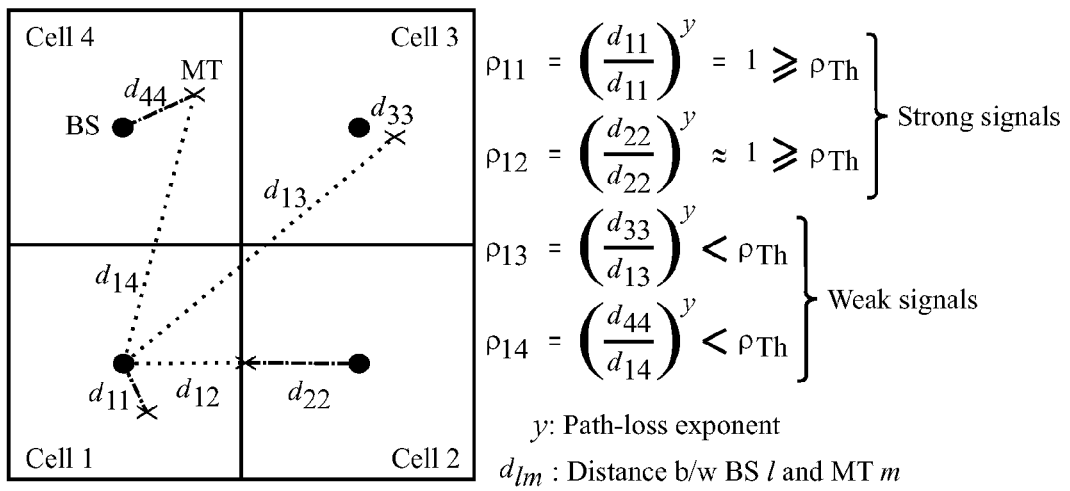
FIG. 1 is a graph showing an example setup showing a rectangular grid of 4 cells, with power control assumed with respect to associated BS.

This application makes reference to a number of publications listed below in the Appendix of References, each of which is incorporated by reference as though fully set forth herein. These publications are referred to herein by numbers set forth in square brackets ([ ]).

Notation

Throughout the current application text, complex baseband notation is used. Vectors are written in boldface. A set is written in double stroke font such as [ ] and its cardinality is denoted by |[ ]|. The expected value and the estimates of a quantity such as s are denoted as E{s} and ŝ, respectively. Random variables are written as uppercase letters and their realization with lowercase letters. A posterior probabilities (APPs) will be expressed as log-likelihood ratios (L-values). A superscript denotes the origin (or receiver module), where it is generated. We distinguish $L^{d1}$, $L^{d2}$ and $L^{ext}$ which are APPs generated at the detector and the decoder of a given BS or externally to it.

The aforementioned and other aspects of the invention will also be apparent from and elucidated with reference to the embodiments of the invention described herein after making reference to the drawings.

Different advanced receiver techniques, suggested in the literature for the uplink, give tradeoffs between complexity and performance. Optimum maximum likelihood detection (MLD) [2, 3] is prohibitively complex for multiple-input multiple-output (MIMO) scenarios employing higher-order modulation. Linear receivers [4-7] are less effective in decoupling the incoming multiplexed data streams, and offer low spatial diversity for full-rank systems. Iterative receivers [8-10] with soft decision feedback offer the best compromise between complexity and performance, and they have been universally adopted as a strategy of choice.

The detailed description of exemplary embodiments of the present invention according to the figures presents a preferred exemplary system model, where a preferred exemplary coupling among users/cells and the channel model are described. Section 3 discusses in detail various components of distributed iterative receivers. In Section 4 different decentralized detection strategies are compared. In Section 5 the effect of quantization of reliability information is examined. Various quantization strategies are compared in terms of information loss and necessary backhaul traffic. Numerical results are presented in Section 6.

An exemplary embodiment of the present invention can be integrated into different communication and handling standards.

In order to facilitate an integration of an exemplary embodiment of the present invention in current communication systems, it is especially useful to use the invention in an environment according to at least one communication standard.

2. Transmission Model

According to a preferred exemplary transmission model, an idealized synchronous single-carrier (narrow band) cellular network in the uplink direction is analyzed. N is the number of receive antennas and M is the number of transmit antennas corresponding to the number of BSs and cochannel MTs, respectively.

A block of information bits $u_m$ from user antenna m is encoded and bit-interleaved leading to the sequence $x_m$ of length K, where m=1 ... M. This sequence is divided into groups of q bits each, which are then mapped to a vector of output symbols for user m of size $K_s = K/q$ according to $S_m = [S_{m,1}, \ldots, S_{m,K_s}] = \text{map}(x_m)$. Each symbol is randomly drawn from a complex alphabet A of size $Q = 2^q$ with $E\{s_{m,k}\} = 0$ and $E\{|s_{m,k}|^2\} = \sigma_s^2$ for m=1 ... M.

A block of $K_s$ symbol vectors $s[k] = [s_{1,k}, s_{2,k}, \ldots, s_{M,k}]^T$ (corresponding to one respective codeword) is transmitted synchronously by all M users. At any BS l, a corresponding block of symbols $r_l[k]$ is received, where the index k is related to time or subcarrier indices ($1 \leq k \leq K_s$):

$$rl[k] = gl[k] \cdot s[k] + n[k], \quad 1 \leq k \leq K_s.$$

With n we denote the additive zero mean complex Gaussian noise with variance $\sigma_n^2 = E\{n^2\}$. For ease of notation, we omit the time index k in the following, because the detector operates on each receive symbol $r_l$ separately.

The row vector $g_l$ is the elementwise product $g_{l,m} = h_{l,m} \sqrt{\rho_{l,m}}$ of weighted channel coefficients $h_{l,m}$ of M cochannels seen at the lth BS. The channel coefficient vector $h_l$, obtained as the current realization of a channel model (the channel is passive on the average, i.e., $E\{|h_{l,m}|^2\} = 1$), is assumed to be known perfectly. The coupling coefficients $\rho_{l,m}$ reflect different user positions (path losses) with respect to base station l. These will be abstracted in the following by two coupling coefficients $\rho_i$, and $\rho_j$ which characterize the BS interaction with strong and weak interferers.

Equation (1) can therefore be written in terms of the desired signal (denoted with the index d) and weak and strong interferences:

$$r_l = g_{ld}s_d + \sum_{i \in \square_l} g_{li}s_i + \sum_{j \in \overline{\square}_l} g_{lj}s_j + n$$

$$= h_{ld}s_d + \underbrace{\sqrt{\rho_i} \sum_{i \in \square_l} h_{li}s_i}_{\text{strong interference}} + \underbrace{\sqrt{\rho_j} \sum_{j \in \overline{\square}_l} h_{lj}s_j}_{\text{weak interference}} + n,$$

where $\rho_{ld}=1$. We note that this is of course a variant of the two-dimensional Wyner model. With $[\ ]_l$ we denote the set of indices of all strongly received interferers at BS l with cardinality $|[\ ]_l|=m_l-1$, where $m_l$ is total number of strongly received signals at BS/. Additionally, $[]_l$ is the complementary set for all weakly received interferers:

$$|[\ ]_l \cup []_l|=M-1.$$

Note that the received signal-to-noise ratio (SNR) is defined as the ratio of received signal power at the nearest BS and the noise power. Specifically, the SNR at the lth BS can be written as SNR=$E\{\|h_{ld}s_d\|^2\}/E\{n^2\}=\sigma_s^2/\sigma_n^2$.

The considered synchronous model is admittedly somewhat optimistic and was recently criticized due to the impossibility to compensate different delays to different mobiles (positions) simultaneously. However, the reason to ignore synchronization errors is twofold. First, it allows the ability to study the possible improvement through base station cooperation without other disturbing effects to obtain bounds (the degradation from nonideal synchronization should thereafter be included as a second step). Second, for OFDM transmission or frequency domain equalization that we envisage in order to obtain parallel flat channels enabling separate JMLD on each subcarrier, we argue that it is possible to keep the interference due to timing and frequency synchronization errors at acceptable levels.

Increased delay spreads of more distant MTs have to be handled by an appropriately adjusted guard interval in the cooperating region. Timing differences between mobiles lead to phase shifts in the channel transfer function, which are taken into account with the channel estimate. An additional consideration relates to frequency offsets due to variations among oscillators.

FIG. 1 shows an example setup showing a rectangular grid of 4 cells, with power control assumed with respect to associated BS.

Doppler effects, one has to evaluate the intercarrier interference induced by relative shifts of the subcarrier spectra of different users. Roughly estimating this with the $\text{sinc}^2(f/f_{sub})$ function of the power spectral density for adjacent subcarriers, the SINR should still be well above 20 dB, if the frequency offset can be kept at the order of 1% and therefore become negligible with respect to the interference to be cancelled on the same resource (oscillator accuracies of 0.1 ppm considered, e.g., in the LTE standardization translate to around 1% in terms of the subcarrier spacing of 15 kHz). We, however, leave the detailed study of asynchronous transmission for future work.

As an example for a cellular scenario, a rectangular grid of 4 cells is shown in FIG. 1, where $p_{Th}$ is the path-loss threshold introduced to distinguish between weak and strong interferers. It is defined as the minimum path loss required for an interferer to be detected separately during the BS processing. It depends upon the constellation size and $m_l$; for example, for 16-QAM and $m_l=2$ we use $p_{Th}=-12$ dB. Periodic or nonperiodic boundary conditions are possible, allowing for representing extended joint operation or isolated groups of cooperating BSs.

3. Distributed Iterative Receiver

Figure 2:
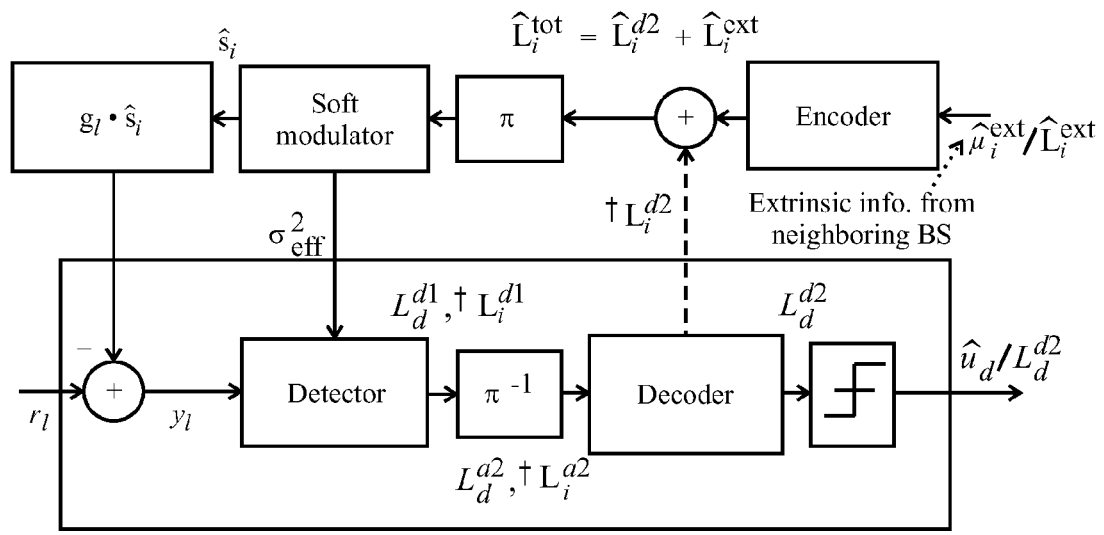
FIG. 2 is a block diagram of a DID receiver at the lth base station, the subscripts d and i representing the desired data stream and the dominant interferes, the variables designated by † being evaluated only in the first pass of the processing through the receiver, the superscripts 1 and 2 corresponding to variables associated with detector and decoder, respectively.

The setup for performing distributed detection with information exchange between base stations is shown in FIG. 2. It comprises one input for the signal $r_l$ generated by the mobile terminals and received at the base station antenna. In addition, it contains a communication interface for exchanging information with the neighboring base stations. This information is either in the form of hard bits $\hat{u}_i$ or likelihood ratios $L_i^{d2}$ of the locally detected signal and corresponding quantities about the estimates of the interfering signals delivered from other base stations. This communication interface is capable of not only transmitting information about the detected data stream to the other base stations, but also receiving information from these base stations.

The receiver processing during initial processing involves either SAIC/JMLD or conventional single-user detection followed by decoding. In subsequent iterations, interference subtraction is performed followed by conventional single-user detection and decoding. Different components of the distributed multi-user receiver are discussed in what follows:

FIG. 2 shows a DID receiver at the lth base station. The subscripts d and i represent the desired data stream and the dominant interferes. Variables designated by † are evaluated only in the first pass of the processing through the receiver. The superscripts 1 and 2 correspond to variables associated with detector and decoder, respectively.
(i) interference cancellation,
(ii) demapping at the symbol detector,
(iii) soft decoding,
(iv) (soft) interference reconstruction.

3.1. Interference canceller and effective noise calculation

At the beginning of every iterative stage, interference of neighboring mobile terminals is subtracted from the signal received at each base station. If $r_l$ is the signal received at the lth base station, the interference-reduced signal $y_l$ at the output of the interference canceller is $$y_l = r_l - g_l \cdot \hat{s}_i = r_l - \sum_{i \in \square_l \cup \overline{\square}_l} g_{li}\hat{s}_i,$$

where $s_i \in \mathbb{C}^{[1 \times n_T]}$ is a vector of symbol estimates. If we exchange only hard decisions about the information bits, then no reliability information is conveyed. Under such condition, additional noise due to the variance of the symbol estimates is not available and the effective noise variance $\sigma_{eff}^2$ is underestimated and taken to be equal to that of receiver input noise, that is, $\sigma_{eff}^2=\sigma_n^2$. On the other hand, if reliability information for the received bits is available, a vector of error variances $e_i^2$ for the estimated symbol streams can be calculated. It is then added to the AWGN noise for the subsequent calculations:

$$\sigma_{eff}^2 = \sigma_n^2 + \sum_{i \in \square_l \cup \overline{\square}_l} |g_{li}|^2 E\{|s_i - \hat{s}_i|^2\} = \sigma_n^2 + \underbrace{\sum_{i \in \square_l \cup \overline{\square}_l} |g_{li}|^2 e_i^2}_{\text{residual-noise}}.$$

The quantities $e_i^2$ and $\hat{s}_i^2$ are both evaluated in the soft modulator (see FIG. 1) and are discussed in detail in Section 3.4.

Note that if the contributions of weak interferers $\hat{s}_i \in []_l$ in (4) and (5) are neglected, an error floor will occur in the performance curves, especially at higher-order modulation.

Since both $e_i^2$ and $s_i^2$ are evaluated upon arrival of estimates from the neighboring base stations, the interference subtractor is not activated during the first pass and $r_l$ is fed directly into the detector. The effective noise due to inherent interference present in the signal during the first pass is calculated based on the mean transmitted signal power and the number $m_d$ of received signals that are to be jointly detected. Therefore, for the first pass, the effective noise $\sigma_{eff}^2$ at the input of the detector of the /th BS, assuming $m_d=m_l$, is given as $$\sigma_{eff}^2 = \sigma_n^2 + \sigma_s^2 \sum_{i \in \Box_l} |g_{li}|^2.$$

3.2. Detection and Demapper APP Evaluation The interference-reduced signal $y_l$ and its corresponding noise value are sent to a demapper to compute the a posteriori probability, usually expressed as an L-value [28]. If $m_d$ data streams (each with q bits/sample) are to be detected, the a posteriori probabilities $L^{d1}(X_k/Y_l)$ of the coded bits $X_\kappa \in \{\pm 1\}$ for k=1 . . . $qm_d$, conditioned on the input signal $y_l$, are given as $$L^{d1}(x_k \mid y_l) = \ln \frac{P[x_k = +1 \mid y_l]}{P[x_k = -1 \mid y_l]}.$$

For $m_d=1$ single-user detection to be applied, when $m_d=m_l$, where $m_l$; is the number of strong signals at the BS /, JMLD-based single-antenna interference cancellation is applied.

We make the standard assumption that the received bits from any of the $m_d$ data streams in $y_l$ have been encoded and scrambled through an interleaver placed between the encoder and the modulator. Therefore, all bits within $y_l$ can be assumed to be statistically independent of each other. Using Bayes' theorem and exploiting the independence of $x_1$, $x_2, \ldots, x_{qm_d}$ by splitting up joint probabilities into products, we can write the APPs as $$L^{d1}(x_k \mid y_l) = \ln \frac{P(y_l \mid x_k = +1) P(x_k = +1)}{P(y_l \mid x_k = -1) P(x_k = -1)}$$

$$= \ln \frac{\sum_{x \in \mathbb{X}_{k,+1}} p(y_l \mid x) \prod_{x_i \in x} P(x_i)}{\sum_{x \in \mathbb{X}_{k,-1}} p(y_l \mid x) \prod_{x_i \in x} P(x_i)}.$$

$X_{k,+1}$ is the set of $2^{qm_d-1}$ bit vectors x having $x_k=+1$, and $X_{k,-1}$ is the complementary set of $2^{qm_d-1}$ bit vectors x having $x_k=-1$; that is, $$\mathbb{X}_{k,+1} = \{x \mid x_k = +1\}, \quad \mathbb{X}_{k,-1} = \{x \mid x_k = -1\},$$

The product terms in (7) are the a priori information about the bits belonging to a certain symbol vector. Since we do not make use of any a priori information in the demapper, these terms cancel out. The L-values at the output of the demap-per can now be obtained by taking the natural logarithm of the ratio of likelihood functions $p(y_l/x)$, that is, $$L^{d1}(x_k \mid y_l) = \frac{\sum_{x \in \mathbb{X}_{k,+1}} p(y_l \mid x)}{\sum_{x \in \mathbb{X}_{k,-1}} p(y_l \mid x)}.$$

Calculating Likelihood Functions

The signal $y_l$ at the detector input contains not only $m_d$ signals that are to be detected at a BS, but also noise and weak interference. For a typical urban environment (assumed here), the number of cochannel interferers from the surrounding cells can be quite large. We therefore make the simplifying assumption that the distribution of the effective noise due to the $(M-m_d)$ interferers together with the receiver noise is Gaussian. The likelihood function $p(y_l/s_d)$ can then be written as $$p(y_l \mid s_d) = \frac{1}{\pi \sigma_{eff}^2} \exp\left\{-\frac{1}{\sigma_{eff}^2}\left(y_l - h_{ld}s_d - \sum_{i \in \Box_l} g_{li}s_i\right)^2\right\},$$

where $s_d$=map(x) is the vector of $m_d$ jointly detected symbols. For single-user detection, $s_d=s_d$ and the sum term in the exponent of (10) disappears (the subscript "d" in $m_d$ and $s_d$ denotes the detected streams). This should not be confused with the desired user meant by the scalar $s_d$.

To evaluate (10), the standard trick that we exploit in our numerical simulation is the so-called "Jacobian logarithm":

$$\ln(e^{x1}+e^{x2})=\max(x_1,x_2)+\ln(1+e^{-|x1-x2|}).$$

The second term in (11) is a correction of the coarse approximation with the max-operation and can be neglected for most cases, leading to the max-log approximation. The APP at the detector output at the lth BS as given in (9) can then be simplified to $$L^{d1}(x_k \mid y_l) \cong \max_{x \in \mathbb{X}_{k,+1}} \left\{-\frac{1}{\sigma_{eff}^2}\left\|y_l - h_{ld}s_d - \sum_{i \in \Box_l} g_{li}s_i\right\|^2\right\} -$$

$$\max_{x \in \mathbb{X}_{k,-1}} \left\{-\frac{1}{\sigma_{eff}^2}\left\|y_l - h_{ld}s_d - \sum_{i \in \Box_l} g_{li}s_i\right\|^2\right\}.$$

Despite the max-log simplification, the complexity of calculating $L^{d1}(x_k/y_n)$ is still exponential in the number of the detected bits in x. To find a maximizing hypothesis in (12) for each $x_k$, there are $2^{qm_d-1}$ hypotheses to search over in each of the two terms (e.g., 16-QAM modulation with $m_d=2$ already requires a search over 256 hypotheses to detect a single bit unless other approximations like tree-search techniques [29] are introduced; for lower-order modulation, more than 2 users can certainly be simultaneously detected with acceptable complexity).

3.3. Soft-Input Soft-Output Decoder

The detector and decoder in our receiver form a serially concatenated system. The APP vector $L^{d1}$ (for each detected stream) at the demapper output is sent after deinterleaving as a priori information $L^{\alpha 2}$ to the maximum a posteriori (MAP) decoder. The MAP decoder delivers another vector $L^{d2}$ of APP values about the information as well as the coded bits.

The a posteriori L-value of the coded bit $x_k$, conditioned on $L^{\alpha 2}$, is $$L^{d2}(x_k \mid L^{a2}) = \ln \frac{P[x_k = +1 \mid L^{a2}]}{P[x_k = -1 \mid L^{a2}]}.$$

Using the sets $Y_{k,+1}$ and $Y_{k,-1}$ to denote all possible codewords x, where bit k equals ±1, respectively, this can after some mathematical manipulation (see [30]) be simplified to $$L^{d2}(x_k \mid L^{a2}) = \ln \frac{\sum_{x \in \Upsilon_{k,+1}} e^{(1/2)x^T \cdot L^{a2}}}{\sum_{x \in \Upsilon_{k,-1}} e^{(1/2)x^T \cdot L^{a2}}}.$$

3.4. Interference Reconstruction

The decoded APP values received from neighboring BS are combined with local information to generate reliable symbol estimates before interference subtraction. It is therefore critical that the dominant interferers are correctly evaluated. Soft symbol vectors $\hat{s}_l$ estimating the signals of the strongest interferers at BS $l$ are generated from the exchanged extrinsic LLR values $L_i^{ext}$ and local dominant interference estimate $L_i^{d2}$, where $\hat{s}_i = [\hat{s}_1, \hat{s}_2 \ldots \hat{s}_M]^T$ removing the component of the desired signal with $s_d = 0$. Since the channels for the links between one MT and different BSs can be assumed to be uncorrelated, the extrinsic and local LLR values are combined by simply adding them, that is, $$L_i^{tot} = L_i^{ext} + L_i^{d2}.$$

The soft symbol estimate $\hat{s}_i$ (one element of the vector $\hat{s}_i$) is evaluated in the soft modulator [31] by calculating the expectation of the random variable $S_i$ given the combined likelihood ratios associated with the bits of the symbol taken from $L_i^{tot}$:

$$\hat{s}_i = E\{S_i \mid L_i^{tot}\}$$
$$= \sum_{s_k \in \mathbb{A}} s_k P(S_i = s_k \mid L_i^{tot}), \forall i \in \Box_l \cup \Box_l.$$

The variance of this estimate is equal to the power of the estimation error and it adds to the receiver noise as described in Section 3.1. Any element of the variance vector $e_i^2 = [e_1^2, e_2^2 \ldots e_M^2]^T$ with $e_d^2 = 0$ is calculated as $$e_i^2 = \mathrm{var}(\hat{s}_i \mid L_i^{tot})$$
$$= \sum_{s_k \in A} (s_k - \hat{s}_i)^2 P(S_i = s_k \mid L_i^{tot}), \forall i \in \mathbb{I}_i \cup \bar{\mathbb{I}}_i.$$

The error power $e_i^2$ depends upon the extent of quantization of the LLR values (see Section 5). If only hard bits are transferred, $\hat{s}_i \in A$ and the estimated symbol error becomes zero, resulting in degraded performance.

4. Decentralized Detection Strategies

The performance of the decentralized processing schemes depends upon receiver complexity and allowable backhaul traffic. In this section, we describe three strategies with increasing complexity that offer different tradeoffs between complexity, performance, and backhaul.

4.1. Basic Distributive Iterative Detection

In the basic version of distributive iterative detection, the decentralized detection problem is treated as parallel interference cancellation by implementing information exchange between the BSs. To keep complexity and backhaul low, only the signal from the associated MT is detected and exchanged between the BSs, while the rest of the received signals are treated as part of the receiver noise. Consider FIG. 2, showing the receiver for BS 1, where only the desired data $s_d$ is detected with single-user detection and transmitted out to other BSs. The APPs at the output of the soft detector are approximated as $$L^{d1}(x_k \mid y_i) \cong \max_{x \in X_{k+1}} \left\{ -\frac{1}{\sigma_{eff}^2} \|y_i - h_{id}s_d\|^2 \right\} - \max_{x \in X_{k-1}} \left\{ -\frac{1}{\sigma_{eff}^2} \|y_i - h_{id}s_d\|^2 \right\}.$$

The decoded estimates of the desired streams are exchanged after quantization. The incoming decoded data streams from the neighboring BS are used to reconstruct the interference energy. Since only the desired data stream is detected, no local estimates of the strongest interferers $L_i^{d2}$ are available.

This implementation is especially useful in the case of low-frequency reuse.

4.2. Enhanced distributive iterative detection with SAIC

The performance of the basic distributed detection receiver degrades for asymmetrical channels encountered in high-frequency reuse networks when dominant interferers are present and the SIR→0 dB.

The error propagation encountered in the basic DID scheme is reduced by improving the initial estimate through single-antenna interference cancellation. Although all the detected data streams are decoded, in this approach only the decoded APPs for the desired users are exchanged between the BSs to limit the amount of backhaul. However, the APPs for the dominant interferers are not discarded, but used in conjunction with reliability information from other BSs to cancel the interference. The performance of this scheme is, however, limited by the number of nondetected weak interferers and/or by the quantization of the exchanged reliability information. Therefore, also the number of required exchanges between the BSs to reach convergence is slightly higher than for the unconstrained scheme described next.

Unlike the basic DID scheme, the performance curves for SAIC aided DID to converge even if the SIR is around or below 0 dB (this is similar to the situation in spatial multiplexing with strong coupling among the streams). Since a BS does not receive multiple copies of the desired signal from several neighboring BSs, there is a loss of array gain and spatial diversity for the desired signals.

4.3. DID with Unconstrained Backhaul

In this version of decentralized detection, all estimates of the received data streams are detected at each BS, and all available soft LLR values are exchanged. This approach uses multiple exchanges of extrinsic information between the BSs and is similar to message passing (although we may use an ML detector during the first information pass). Since all detected input streams are exchanged, both diversity and array gain are obtained. In addition, the algorithm converges more quickly than the ones with constrained backhaul. While the simultaneous detection of multiple data streams through SAIC during initial iteration can further speed up convergence, low-complexity SUD detection during the first iteration is normally sufficient and results in only marginal degradation in performance. The amount of backhaul per iteration for a fully coupled system ($m_i = M$), however, grows cubically in the cooperating setup size, that is, backhaul $\propto MN(M-1)$, making this scheme impractical even for a few BSs in cooperation.

5. Quantization Of The Reliability Information

A posteriori probabilities at the decoder are preferably quantized before transmission causing quantization noise, which is equivalent to information loss in the system. By increasing the number of quantization levels, this loss will decrease at the cost of added backhaul, which has to stay within guaranteed limits from the network operator's standpoint.

The information content associated with L-values varies with their magnitude. While single-bit quantization will incur little information loss at high reliability values, it leads to considerable degradation in performance for L-values having their mean close to zero. Therefore, L-values following a bimodal Gaussian distribution should not simply be represented using uniform quantization. Even nonuniform quantization according to [32, 33] applied directly to the L-values by minimizing the mean square error (MSE) between the quantized and nonquantized densities is not optimum as we will show. In what follows we develop a quantization strategy based on information-theoretic concepts, such as "soft bits" and mutual information. Representation of the L-values with these quantities takes the saturation of the information content (with increasing magnitude of the L-values) into account and improves the backhaul efficiency

5.1. Representation of L-Values Based on Mutual Information

Mutual information I(X;L) between two variables x and l measures the average reduction in uncertainty about x when l is known and vice versa [34]. We use mutual information to measure the average information loss about binary data if the Lvalues are quantized. A general expression for mutual information based on entropy and conditional entropy is $$I(X;L) = H(L) - H(L/X).$$

Assuming equal a priori probability for the binary variable $x \in \{-1; +1\}$, a simplified expression for the mutual information between x and the a posteriori L-value at the decoder output is (in what follows all logarithms are with respect to base 2)

$$I(X;L) = \frac{1}{2} \sum_{x=\pm 1} \int_{-\infty}^{+\infty} p(l|x) \ln\left[\frac{2p(l|x)}{p(l|x=+1) + p(l|x=-1)}\right] dl.$$

Exploiting the symmetry and consistency properties of the L-value density [28], (20) becomes $$I(X;L) = \int_{-\infty}^{\infty} p(l|x=+1)[1 - \ln(1 + e^{-l})] dl$$
$$= 1 - E\{\ln(1 + e^{-l})\}.$$

If in the last relation the expected bit values or "soft bits" [28] defined as $\lambda = E\{x\} = \tan h(l/2)$ are used, then an equivalent expression for the mutual information between X and L is $$I(X;L) = E\{\ln(1+\lambda)\},$$

In practice, the expectation in (21) and (22) is approximated by a finite sum over the L-values in a received codeword:

$$I(X;L) \cong 1 - \frac{1}{K}\sum_{k=1}^{K} \ln(1 + e^{-l_k x_k}) = \frac{1}{K}\sum_{k=1}^{K} \ln(1 + \lambda_k x_k).$$

An expression to calculate the conditional mutual information based solely on the magnitude |l| of the APP values was provided in [35]. If we evaluate the binary entropy (the entropy of a binary random variable x is $H_b = -x \ln x - (1-x) \ln(1-x)$) of the (instantaneous) bit error probability $P_e(l) = e^{-|l|/2}/(e^{|l|/2} + e^{-|l|/2})d|l|$, the probability that hard decisions based on the L-values lead to the wrong sign, $l_k x_k = -1$, is given by $\int_0^{\infty} p(|l|) P_e(l) d|l|$. Now the mutual information between X and L can be compactly written (as the expectation of the complement of the binary entropy of the bit error rate $P_e$ [36]):

$$I(X;L) = 1 - E\{H_b(P_e)\}$$
$$= 1 + E\{P_e \ln(P_e) + (1 - P_e)\ln(1 - P_e)\}.$$

From the above expressions, three different L-value representations are conceivable for quantization. They are sketched as a function of the magnitude of the L-values in FIG. 3:

(i) original L-values, (ii) soft bits: $\lambda(l) = \tan h(l/2)$, (iii) mutual information: $l(l) = 1 - H_b(P_e)$.

The underlying L-value density depends only on a single parameter $\sigma_L$, because mean and variance are related by $\mu_L = \sigma_L^2/2$ [37]. This density is given as $$p_L(l) = \frac{1/2}{\sqrt{2\pi}\,\sigma_L}\left[\exp\left\{-\frac{(l - \sigma_L^2/2)^2}{2\sigma_L^2}\right\} + \exp\left\{-\frac{(l - \sigma_L^2/2)^2}{2\sigma_L^2}\right\}\right].$$

Figure 3:
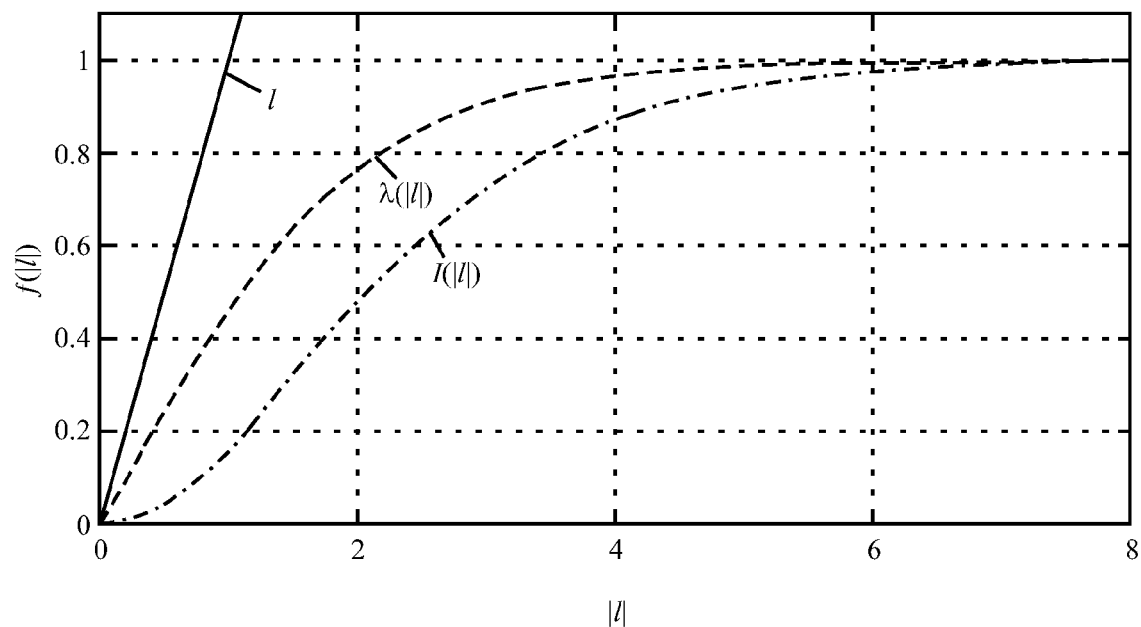
FIG. 3 is a graph showing L-value $l$, soft-bit $\lambda(l)$, and mutual information $I(l)$ representations of the LLR plotted as a function of the magnitude $|l|$ of the LLR.

FIG. 3 shows L-value l, soft-bit $\lambda(l)$, and mutual information I(l) representations of the LLR plotted as a function of the magnitude |l| of the LLR.

Figure 4:
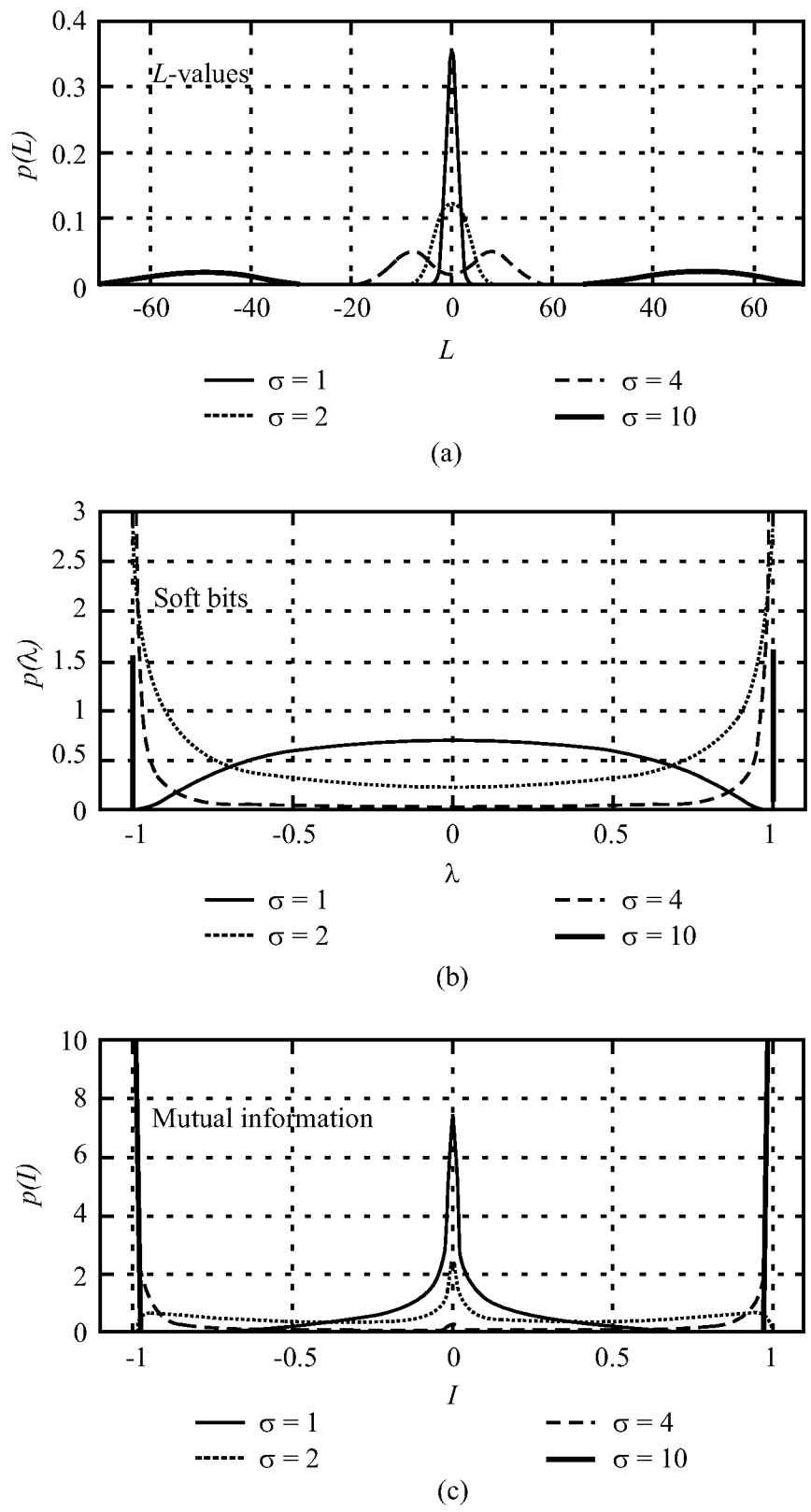
FIG. 4 is a set of graphs showing a comparison of the distribution of Lvalues represented in the original bimodal Gaussian form or by soft bits or mutual information.

Using the distribution function (cdf) of $p_L(l)$ and the inverse function $l = 2 \tan h^{-1}\lambda$, the transformed soft value density can be obtained in closed form as $$p_L(l) = \frac{1/2}{(1-\lambda^2)\sqrt{2\pi}\,\sigma_L}\left[\begin{array}{l}\exp\left\{-\frac{(4\tanh^{-1}\lambda - \sigma_L^2)^2}{8\sigma_L^2}\right\} + \\ \exp\left\{-\frac{(4\tanh^{-1}\lambda + \sigma_L^2)^2}{8\sigma_L^2}\right\}\end{array}\right],$$

while a mutual information density based on (23) can only be calculated numerically. The three densities that can be alternatively quantized are illustrated in FIG. 4. The mutual information density is mirrored at the ordinate to conserve the sign as in the LLR or $\lambda$-representations. The performance of different quantization schemes will be investigated next.

5.2. Quantization Strategies

Mutual information evaluated with $H_b(P_e)$ and similarly the soft-bit representation are nonlinear functions of L-values that saturate with increasing magnitude. This suggests that nonuniform quantization schemes that minimize the mean-squared quantization error should be able to exploit this and have in addition an advantage over uniform quantization. Preferably the well-known Lloyd-Max quantizer is adopted.

Nonuniform Quantization in the LLR Domain

The optimal quantization scheme due to Lloyd [32] and Max [33] was applied to the L-value density of the decoder output. The reconstruction levels $r_i$ are determined through an iterative process after the initial decision levels $d_i$ have been set. The objective function to calculate the optimal $r_i$ reads $$\min_{r_i} \sum_{i=1}^{R} \int_{d_i}^{d_{i+1}} (1-r_i)^2 p(l) dl.$$

FIG. 4 shows Comparison of the distribution of L-values represented in the original bimodal Gaussian form or by soft bits or mutual information.

This is iteratively solved by determining the centroids $r_i$ of the area of p(l) between the current pairs of decision levels $d_i$ and $d_{i+1}$:

$$r_i = \frac{\int_{d_i}^{d_{i+1}} l p(l) dl}{\int_{d_i}^{d_{i+1}} p(l) dl},$$

and later updating the decision level for the next iteration as $$d_i = \frac{1}{2}(r_{i-1} + r_i).$$

The number of quantization levels and the number of quantization bits are denoted with $R=2^b$ and b, respectively. Results for b=1, 2 and 3 bits can be found in the appendix.

Nonuniform Quantization in the Soft-Bit Domain

In this approach, the optimum reconstruction and decision levels to quantize the L-values were calculated in the "soft-bit domain" again in accordance with (27) and (29). Detailed results for b=1-3 quantization bits are shown again in the appendix. It should be stressed that the final quantization still occurs in the L-value domain, because the optimized levels are mapped back via $l=2 \tanh^{-1}(\lambda)$. Note that only the number of quantization levels and the variance of the L-values have to be communicated between the BSs to interpret the exchanged data, because the optimized levels can be stored in lookup tables throughout the network.

Mutual Information Loss

Based on the set of levels $d_i$ and $r_i$, the mutual information for quantized and nonquantized L-value densities was calculated. The difference represents the reduction or loss in mutual information $\Delta I$ due to quantization:

$$\Delta I = I_{non-quant} - I_{quant}.$$

Figure 5:
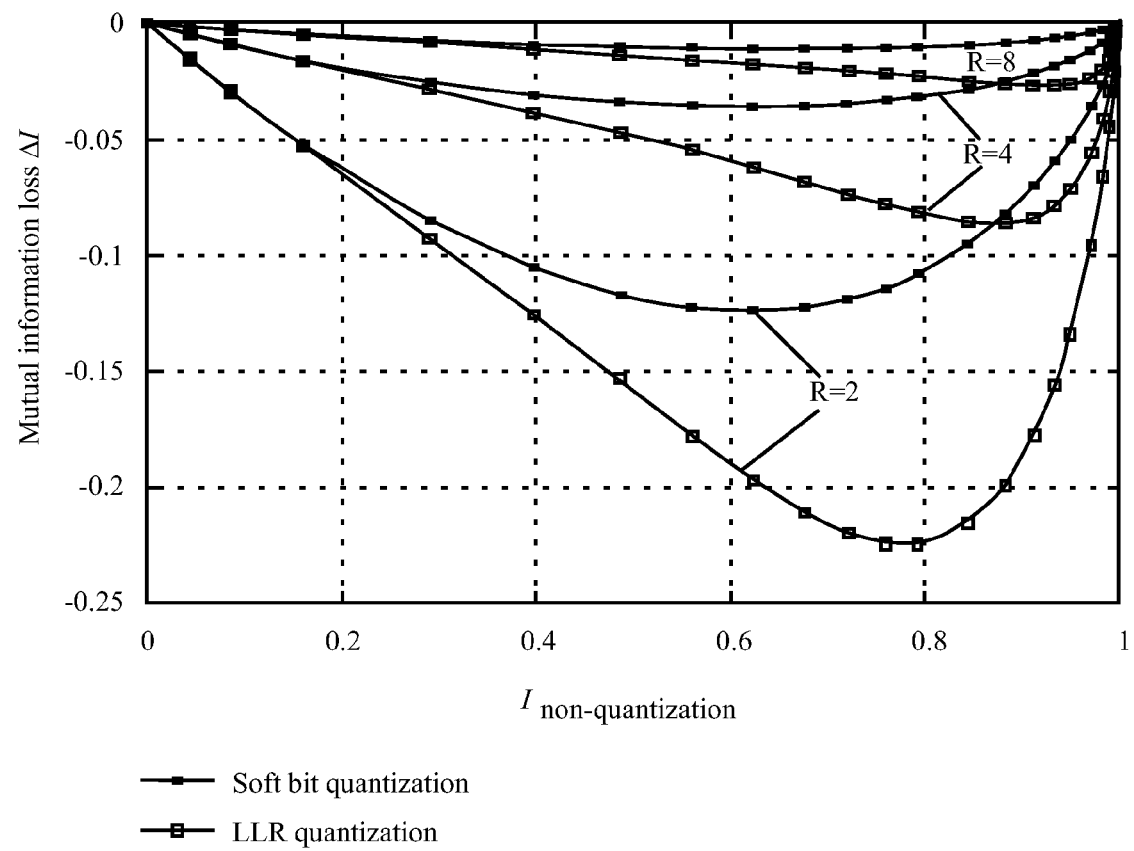
FIG. 5 is a graph showing mutual information loss $\Delta I(X; L)$ for nonuniform quantization levels determined in the LLR and soft-bit domains (1-3 quantization bits)

This loss is shown in FIG. 5 as a function of the average mutual information of the nonquantized L-values. $I_{non-quant}$ was found with $p_L(l/x=+1)$ evaluating (21). Using the optimized reconstruction and decision levels from the appendix, $I_{quant}$ was determined explicitly as $$I_{quant} = \sum_{i=1}^{R} [1 - \ln(1 + e^{-r_i})] \int_{d_i}^{d_{i+1}} p(l|x=+1) dl$$

$$= \frac{1}{2} \sum_{i=1}^{R} [1 - \ln(1 + e^{-r_i})] \text{erf}\left(\frac{l - \mu_L}{\sqrt{2}\sigma_L}\right)\Bigg|_{d_i}^{d_{i+1}}.$$

The larger loss due to quantization of the L-values is clearly visible in FIG. 5, where $\Delta I$ is plotted for 1-3 quantization bits (R=2, 4, 8 levels).

We also tested the combining of two mutual information values with and without quantization as it occurs in decentralized detection with limited backhaul. For transmission of BPSK symbols over an AWGN channel, the relation between FIG. 5 shows Mutual information loss $\Delta I(X; L)$ for non-uniform quantization levels determined in the LLR and soft-bit domains (1-3 quantization bits).

Figure 6:
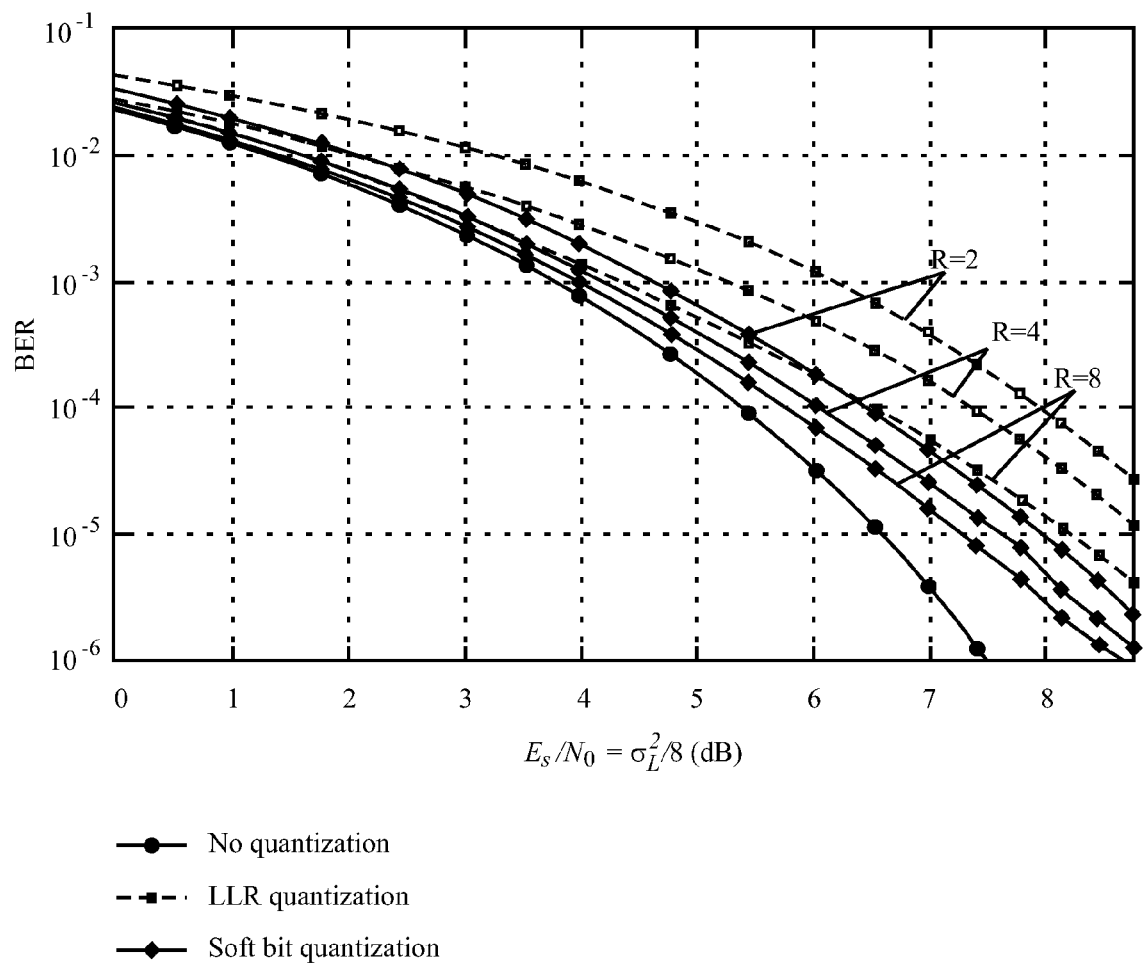
FIG. 6 is a graph showing BER after soft combining of L-values for quantized information exchange with optimized levels in either the soft-bit or LLR domain.

FIG. 6 shows BER after soft combining of L-values for quantized information exchange with optimized levels in either the soft-bit or LLR domain.

SNR and the associated variance of the L-values at the channel output is given by $E_s/N_0 = 8\sigma_L^2$ [36]. Generating two independent distributions for the same $\sigma_L^2$ and combining the unquantized $L_1$ with $L_2$ according to $L_{tot} = L_1 + L_2$, we compared the bit error rates (probability of the L-value having the wrong sign) for unquantized $L_2$ and quantized $L_2$ based either on optimized quantization levels in the LLR or on soft-bit domains. FIG. 6 shows the BER again for b=1-3 quantization bits.

We note that the curves for quantization based on the soft-bit domain already for only 1 quantization bit approach the performance of 2 to 3 quantization bits based on the L-value domain.

6. Numerical Results

In this section, we provide simulation results to illustrate the performance of distributed iterative strategies in an uplink cellular system. A synchronous cellular setup of 3×3 cells (N=M=9) or 2×2 cells (N=M=4) is assumed. The number of strongly received signals $m_l$ varies from 1 to 5. The dominant interferers for any BS l are defined by the index set $$[\ ]_l = \{i: l (\bmod M) + 1 \leq i \leq l + m_l (\bmod M) + 1\},$$

where $1 \leq l \leq M$ and x(mod y) represents the module operation. As an example, the 2×2 setup with $m_l = 2$ strong interferers and $p_j = 0$ is characterized by the following coupling matrix:

$$\rho = \begin{bmatrix} 1 & \rho_i & \rho_i & 0 \\ 0 & 1 & \rho_i & \rho_i \\ \rho_i & 0 & 1 & \rho_i \\ \rho_i & \rho_i & 0 & 1 \end{bmatrix}.$$

The number of symbols in each block (codeword) is fixed to 504. A narrowband flat fading i.i.d. Rayleigh channel model is assumed with an independent channel for each symbol. It is further assumed that the receiver has perfect channel knowledge for the desired user signal as well as the interfering signals. A half-rate memory two-parallel concatenated convolutional code with generator polynomials $(7, 5)_8$ is used in all simulations with either 4-QAM or 16-QAM modulation. The number of information exchanges between neighboring base stations is fixed to five unless otherwise stated.

6.1. Comparison of Different Decentralized Detection Schemes

Figure 7:
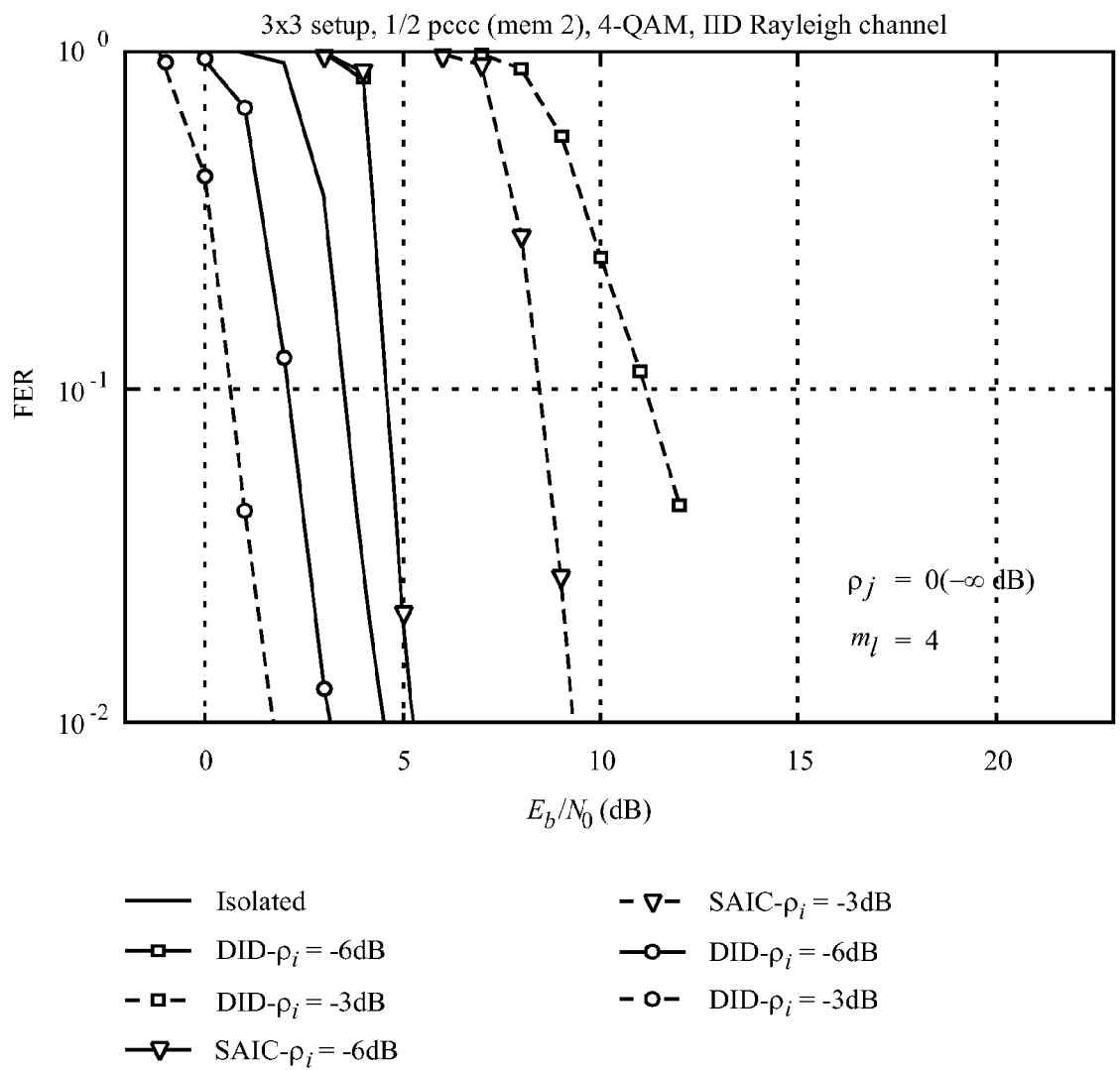
FIG. 7 is a graph showing FER curves for different receive strategies in decentralized detection, distributed iterative detection (DID), SAIC-aided DID (SAIC), and DID with unconstrained backhaul (DID-UB)

The performance of different decentralized detection schemes described in Section 4 is presented in FIG. 7 for a 3×3 setup and 4-QAM modulation.

Three dominant interferers are received at each BS, that is, $m_l = 4$, with normalized dominant interferer path loss $\rho_i \in \{0.23, 0.5\}$ (−3 and −6 dB, resp.). The path loss for the weak interferers $p_j$ is assumed to be zero, and unquantized L-values are exchanged. As already mentioned, both basic DID and DID with SAIC have the inherent disadvantage that they only utilize the desired user energy received at the associated BS for signal detection. As a consequence, they do not benefit from array gain or additional spatial diversity and are bounded by the isolated user performance. Although the performance of the basic-DID scheme is comparable to that of SAIC-DID for low values of $p_i$, the difference becomes substantial for higher values of $p_i$. In fact, for $p_i \approx 1$ and for higher-order modulation (16-QAM or higher), the basic-DID scheme does not converge.

In terms of performance, the strategy of exchanging all processed information between the BSs with unlimited backhaul (DID-UB) is the clear winner. This advantage, however, comes at the cost of huge backhaul, with an increase in the number of exchanges between the BSs per iteration $\propto m_I$. Besides, the large array gain of the near-optimal scheme diminishes (not shown here) for less-robust higher-order modulation, that is, 16-QAM.

FIG. 7 shows FER curves for different receive strategies in decentralized detection: distributed iterative detection (DID), SAIC-aided DID (SAIC), DID with unconstrained backhaul (DID-UB).

Figure 8:
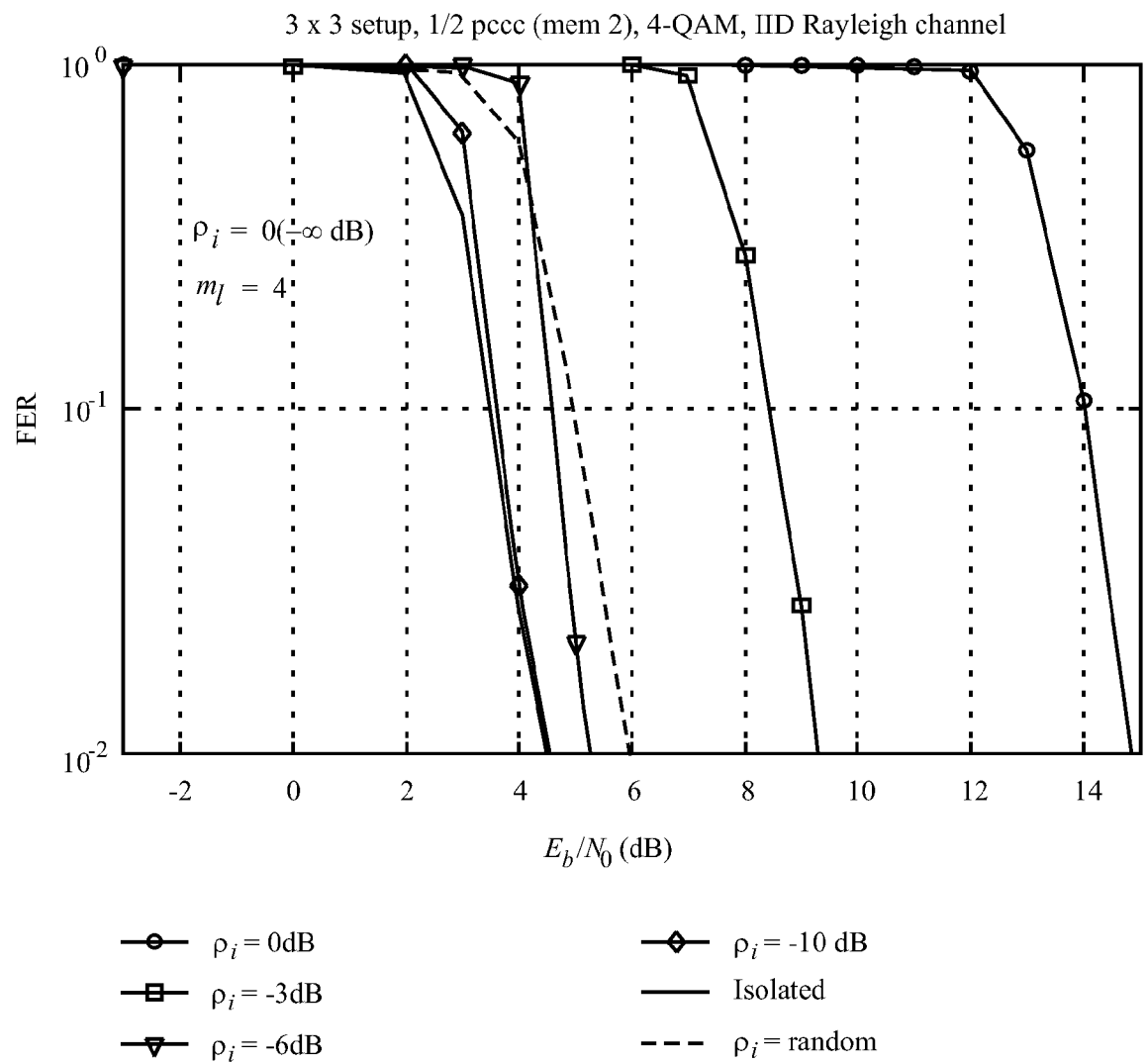
FIG. 8 is a graph showing an effect of path loss of the dominant interferer $p_i$, SAIC-DID, for the dashed curve labeled as "random", each element of the path-loss vector $0 \leq p_{l,m} < 1, l \neq m$, is randomly generated with uniform distribution.

FIG. 8 shows an effect of path loss of the dominant interferer $p_i$, SAIC-DID. For the dashed curve labeled as "random", each element of the path-loss vector $0 \leq p_{l,m} < 1$, $l \neq m$, is randomly generated with uniform distribution.

6.2. SAIC-DID with Unquantized LLR Exchange

FIG. 8 shows the FER curves for the (3×3) cell setup with $m_I=4$, $p_j=0$, while the normalized path losses $p_i$ of the dominant interferers vary from 0 to 1. Physically, this can be interpreted as an interferer moving away from its own BS towards the base station where the observations are being made. For a network with more than a single tier of neighbors, it is physically impossible to have a high normalized path loss between all the communicating entities. The curve for $p_i=0$ dB is practically not possible and serves only as the indication of the lower performance limits of the receiver. The results for 4-QAM modulation show that the performance stays quite close to an isolated user performance, and has a loss of less than 1 dB at FER of $10^{-2}$ for $p_i \leq -6$ dB.

To show the behavior of a setup with random path losses, the elements $p_{l,i}$ of the path-loss vector are randomly generated with uniform distribution at every channel realization, where $i \in [\ ]_l$, and $0 \leq p_i < 1$. The simulation results are shown by the dashed curve labeled as "random", which is comparable to $p_i=-6$ dB curve.

Figure 9:
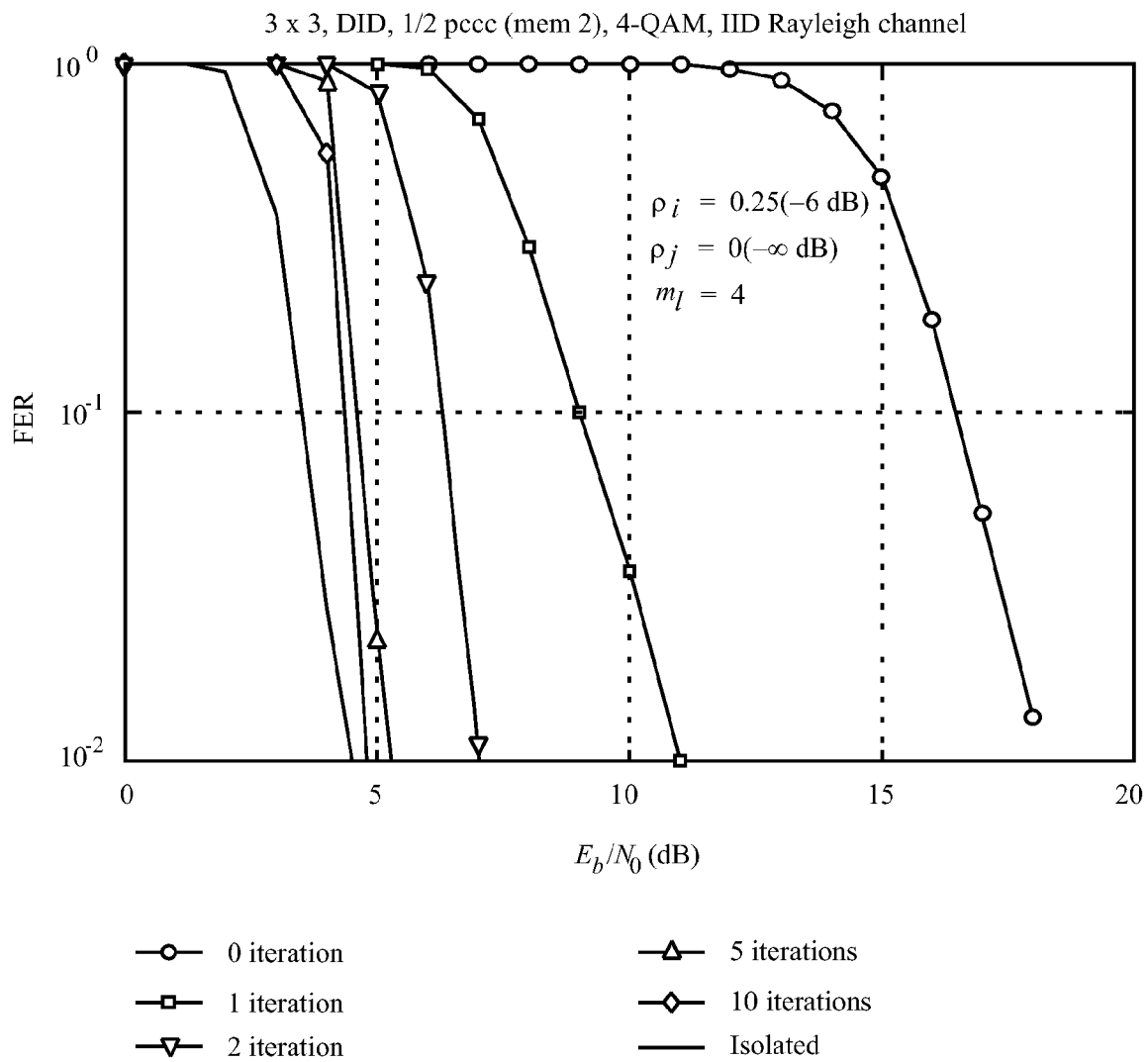
FIG. 9 is a graph showing iterative behavior of SAIC-DID exchanging soft APP values.

FIG. 9 illustrates the iterative behavior of the SAIC-based receive strategy. There is a large improvement in performance after the initial exchange of decoder APPs, which diminishes with later iterations. We therefore restrict all subsequent simulations to five iterations as very little performance improvement is gained beyond this point.

Figure 10:
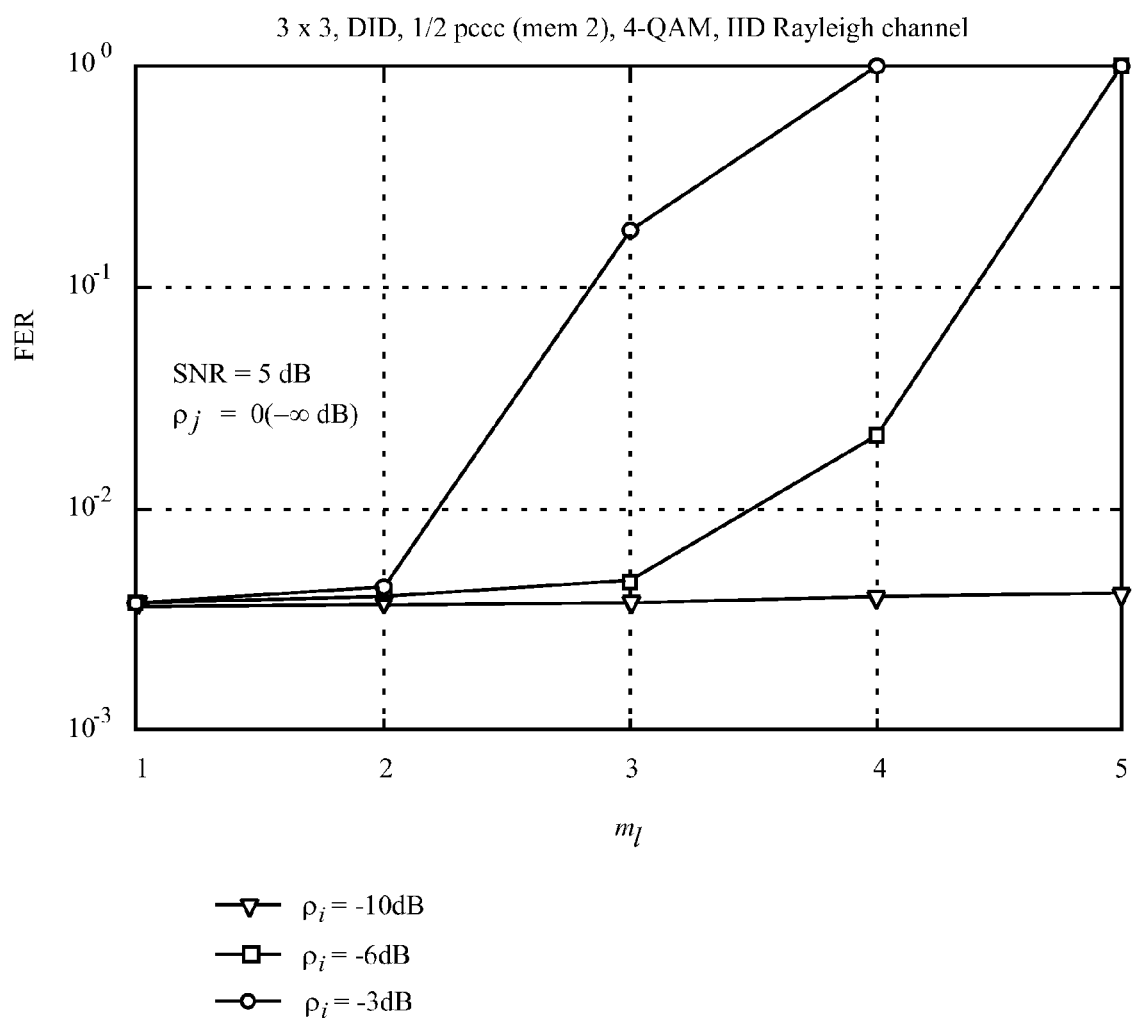
FIG. 10 is a graph showing FER for SAIC-DID, plotted as function of the number of dominant cochannel signals $m_i$ at SNR=5 dB.

FIG. 10 shows the FER for SAIC-DID plotted as a function of the number of dominant cochannel signals $m_I$ at SNR=5 dB. The FER curve for $p_i=-10$ dB indicates that the performance is relatively independent of $m_I$ at low interference levels. However, when $p_i \rightarrow 1$, the performance degrades considerably with additional interferers. For example, for $m_I=5$ and $p>-6$ dB, the SAIC-DID schemes only start converging at an SNR higher than 5 dB. For a typical cellular setup using directional BS antennas with downtilt, $m_I$ normally stays between 2 and 4 for 4-QAM, resulting in the FER water fall to be located around 5 dB.

Figure 11:
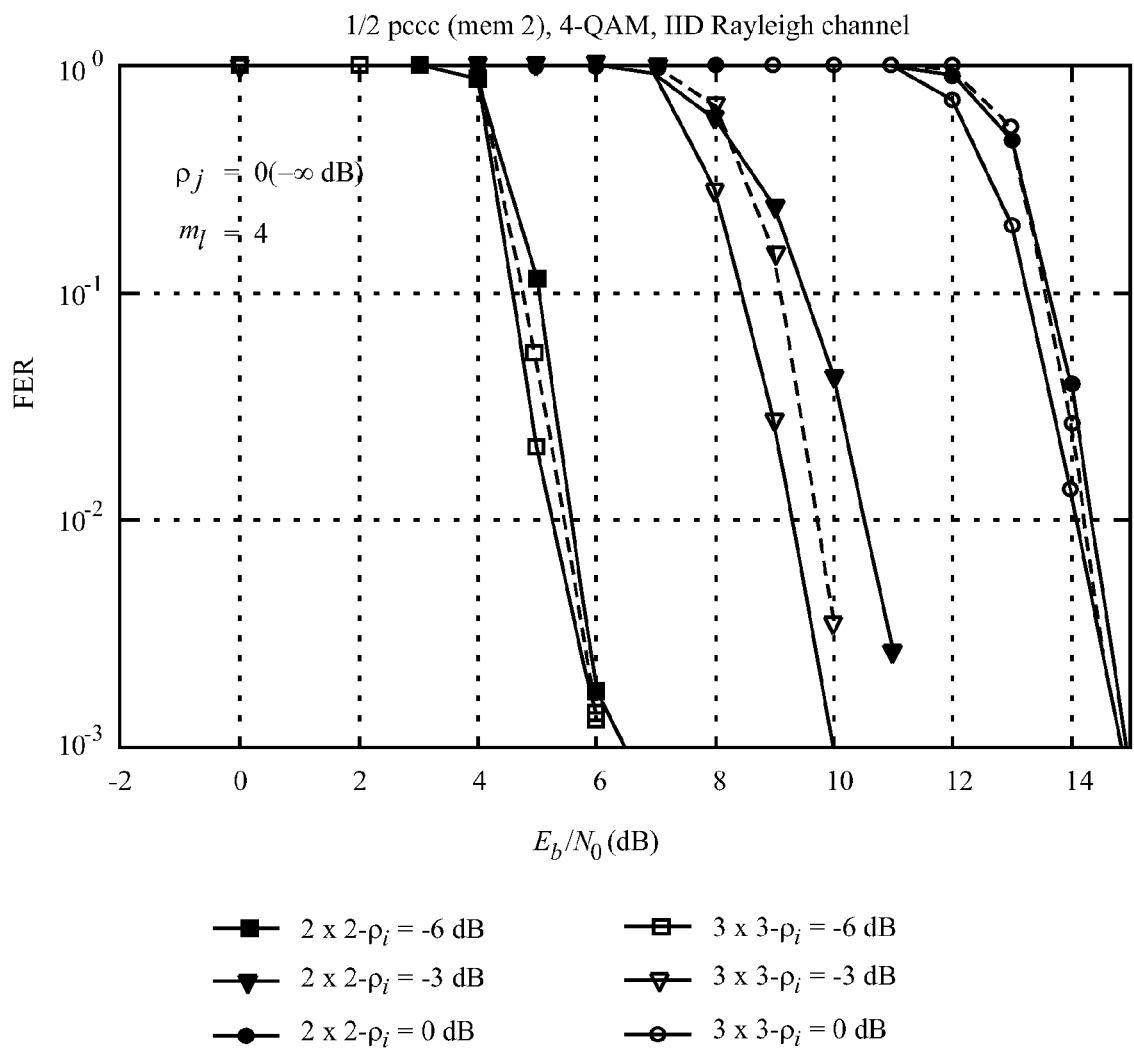
FIG. 11 is a graph showing SAIC-DID performance comparison for 2×2 and 3×3 cells setup, in which each MT is received strongly at 4 BSs, while each BS receives signals from 4 MTs, the two curves for 3×3 cells setup giving the bounds for different possible combinations of couplings within the setup.

To see how the performance of a received strategy scales with the size of the network, FIG. 11 depicts a 2×2 cell network in comparison to a 3×3 cell network for different values of the normalized path loss $p_i$. The number of dominant received signals at each BS is fixed to 4. For the solid curves, the set $[\ ]_l$ is defined according to (32), with the modulo operation ensuring that symmetry conditions are incorporated; that is, each MT is received by 4 BSs, while each BS receives 4 MTs. Interestingly, the performance for a 2×2 cell network with greater mutual-coupling is only slightly worse than in a 3×3 cell setup. The mutual-coupling in a 3×3 cell setup can be increased by symmetrically placing the dominant interferers on either side of the leading diagonal. The resulting difference in performance between the setups of two sizes is further reduced (dashed lines). This suggests that for a given number of dominant interferers $m_I$ and couplings $p_i$, the performance depends on the sizes of the cycles that are formed by exchanging information among the BSs.

FIG. 10 shows FER for SAIC-DID, plotted as function of the number of dominant cochannel signals $m_I$ at SNR=5 dB.

FIG. 11 shows SAIC-DID performance comparison for 2×2 and 3×3 cells setup. Each MT is received strongly at 4 BSs, while each BS receives signals from 4 MTs. The two curves for 3×3 cell setup give the bounds for different possible combinations of couplings within the setup.

Figure 12:
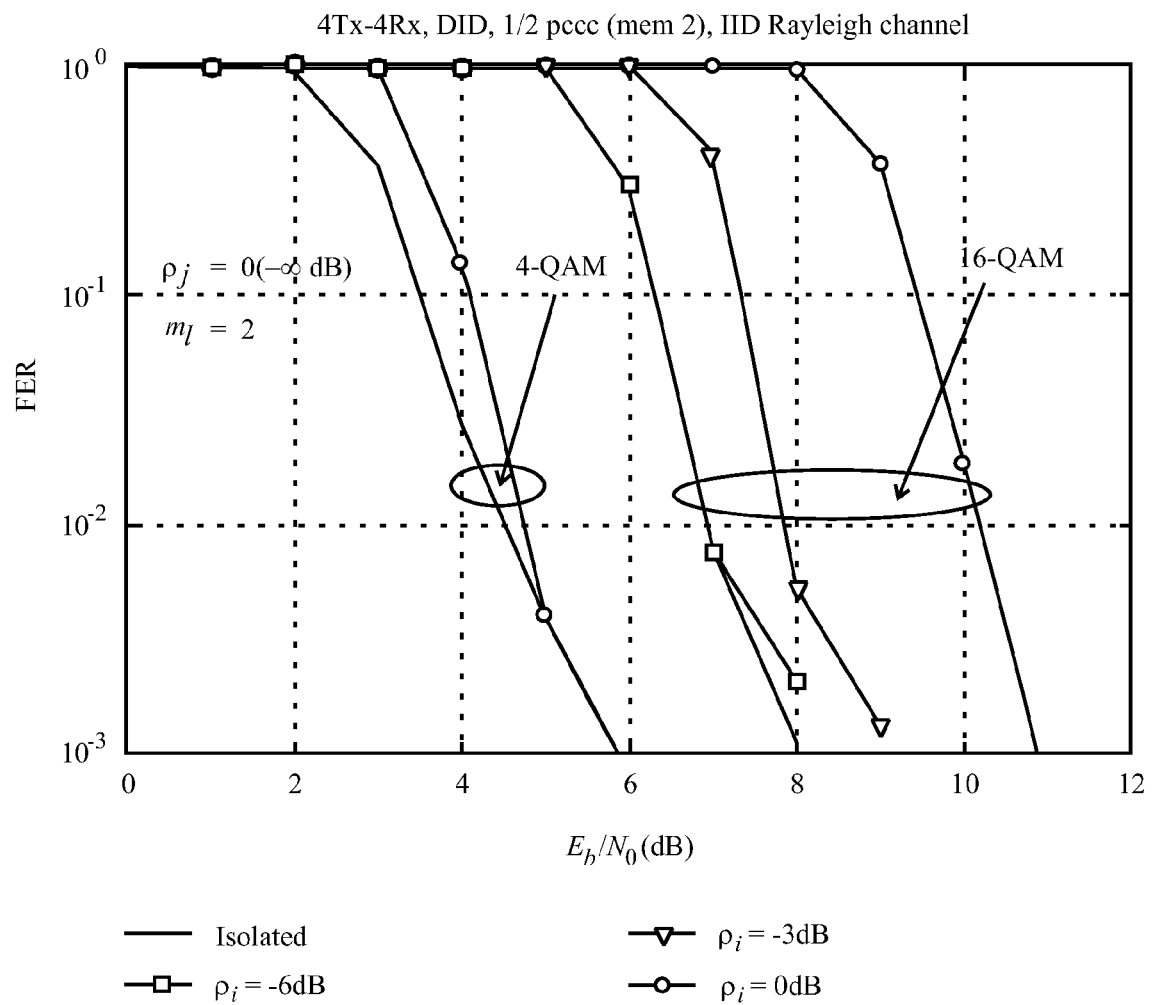
FIG. 12 is a graph showing the effect of path loss of the dominant interferer $p_i$ for different modulation orders, in which each BS sees just two dominant signals $m_i=2$.

FIG. 12 shows Effect of path loss of the dominant interferer $p_i$ for different modulation orders. Each BS sees just two dominant signals $m_I=2$.

FIG. 12 shows the performance of SAIC-DID for 4-QAM and 16-QAM modulations, employing a 2×2 cellular setup with only a single dominant interferer, $m_I=2$, and varying the coupling strength. While the performance of 4-QAM degrades only marginally for $p_i=0$ dB at the FER of $10^{-2}$, the loss of the performance for 16-QAM is already more than 3 dB. This indicates that with additional impairments, strong cochannel interferers are difficult to handle for 16-QAM modulation.

6.3. Quantization of L-Values and Backhaul Traffic

Figure 13:
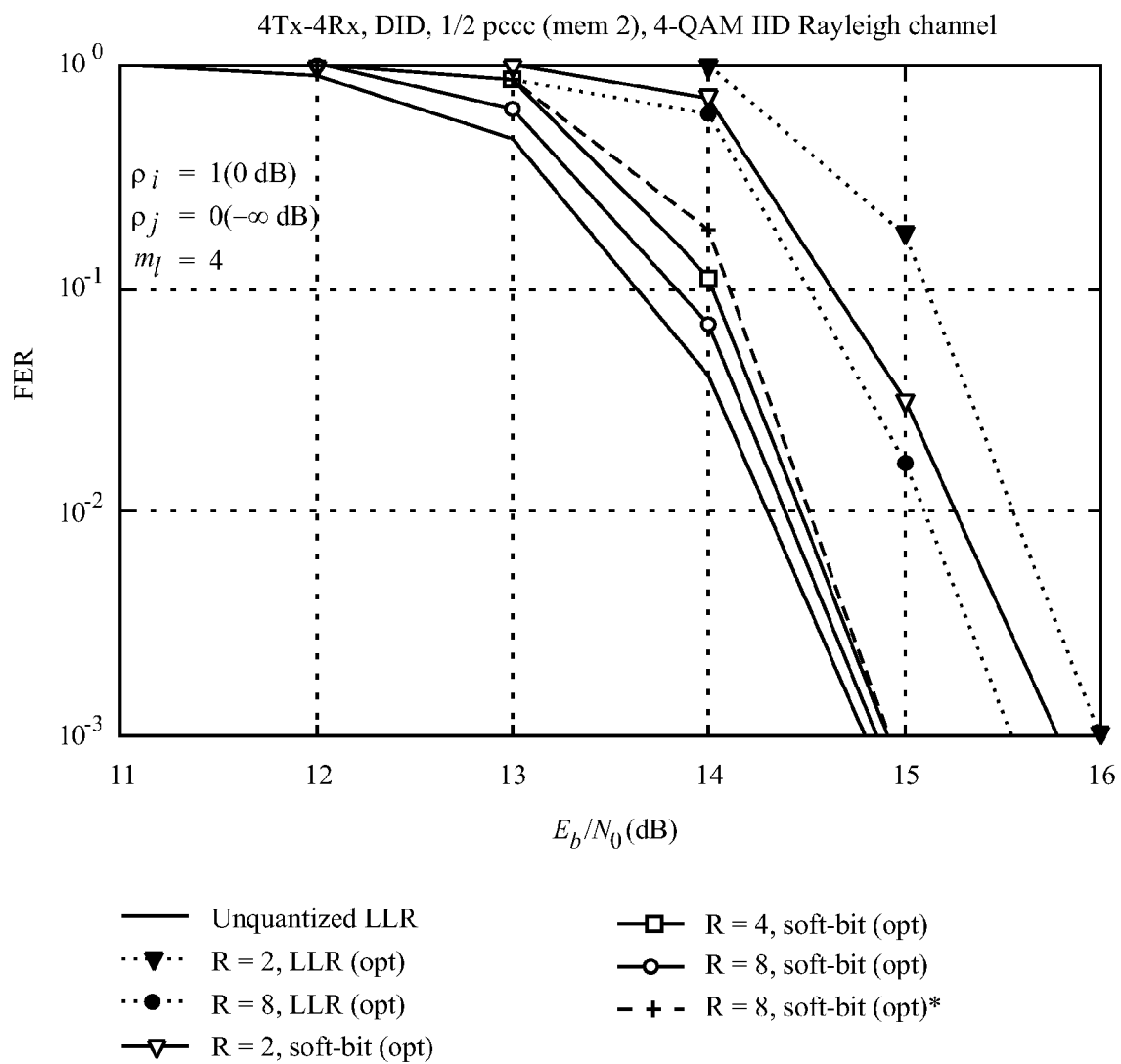
FIG. 13 is a graph showing the effect of quantization of the exchanged decoder LLR values, where $p_i=0$ dB, the curve labeled with "+" exchanging only those bits that have changed signs between iterations, and adaptively sets the number of quantization intervals during each iteration to reduce backhaul.

The performance of the proposed scheme for the two different quantization strategies, optimal quantization in the soft-bit and LLR domains, and for different numbers of quantization bits is presented in FIG. 13. The normalized path loss $p_i=1$ (0 dB) is chosen such that any loss of quality of the estimates has a pronounced effect on system performance. As already predicted, quantization in the soft-bit domain is clearly superior to that in the LLR domain. For soft-bit domain quantization, exchanging hard bits will result in a performance loss of one dB which is reduced to almost one quarter of a dB for 2-bit quantization (R=4). Any further increase in quantization bits will bring limited gains.

For the dashed curve labeled with a plus sign ("+") only those bits that have changed signs between iterations are exchanged, and the number of quantization intervals R is set adaptively during each iteration to save backhaul capacity. The maximum number of reconstruction levels is $R_{max}=8$. It is illustrated that despite a large improvement in backhaul, the performance degrades only marginally.

FIG. 13 shows Effect of quantization of the exchanged decoder LLR values, where $p_i=0$ dB. Curve labeled with "+" exchanges only those bits that have changed signs between iterations, and adaptively sets the number of quantization intervals during each iteration to reduce backhaul.

As already mentioned, all decoded information bits are only exchanged during the first iteration to minimize the backhaul, while in the later iterations only those bits that have changed signs are exchanged after applying some lossless compression, for example, run-length encoding or vector quantization techniques.

Figure 14:
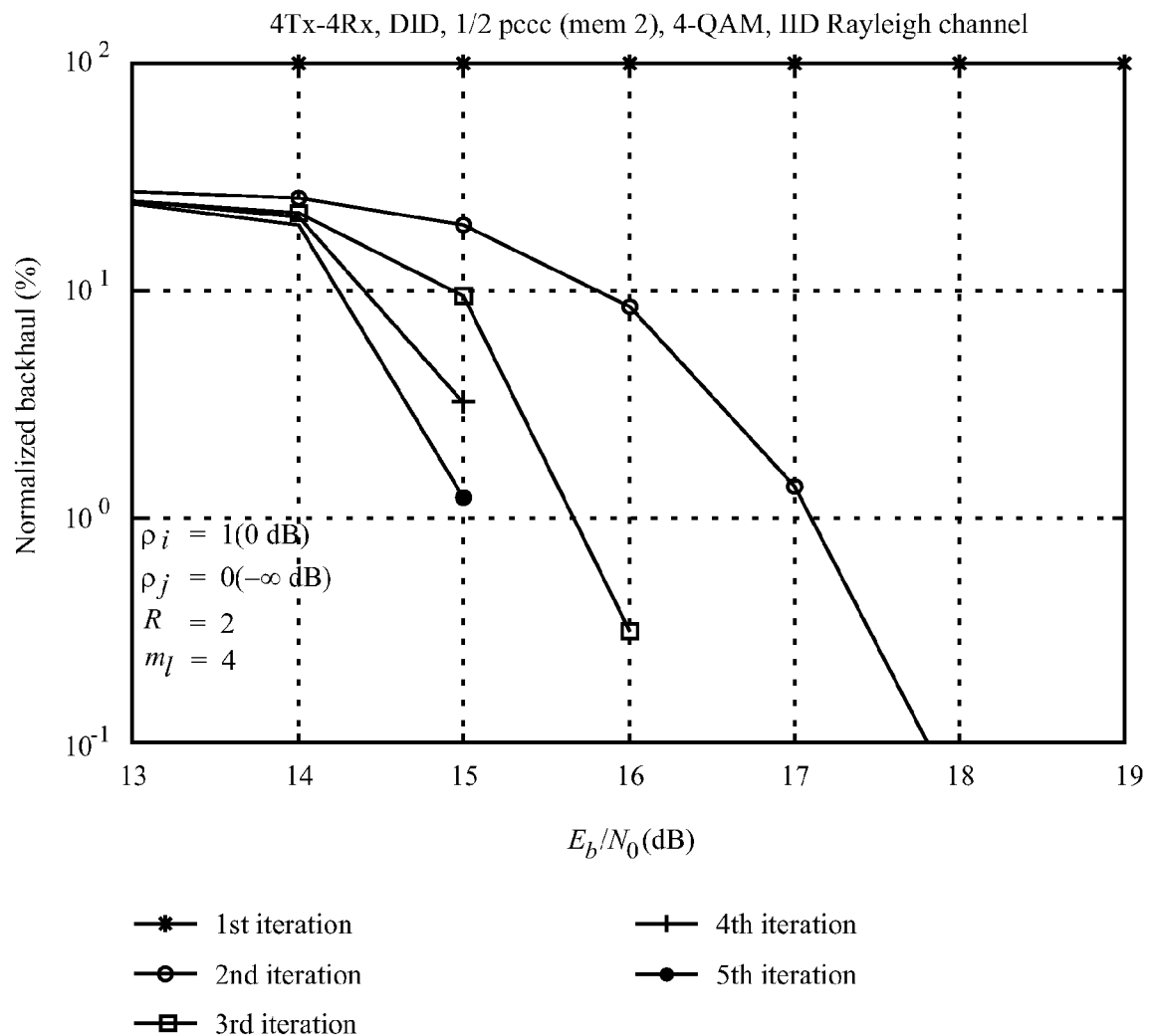
FIG. 14 is a graph showing backhaul traffic normalized with respect to total information bits single-bit quantization of LLR values being performed only those bits that have changed signs between iterations being exchanged ($p_i=0$ dB)

FIG. 14 shows that the average backhaul traffic during different iterations is plotted as a function of SNR for a hard information bit exchange. In the operating region of interest ($E_b/N_0 > 15$ dB), there is negligible traffic after 3 iterations. The total backhaul in this operating region lies between 100% and 150% of the total number of information bits received, which is a substantial gain over DAS backhaul traffic requirement [19]. It must be mentioned that any additional overhead, required for the compression technique (such as run-length) and used for exchanging a fraction of the estimates, was not taken into account.

6.4. Sensitivity to Additional Interference

Figure 15:
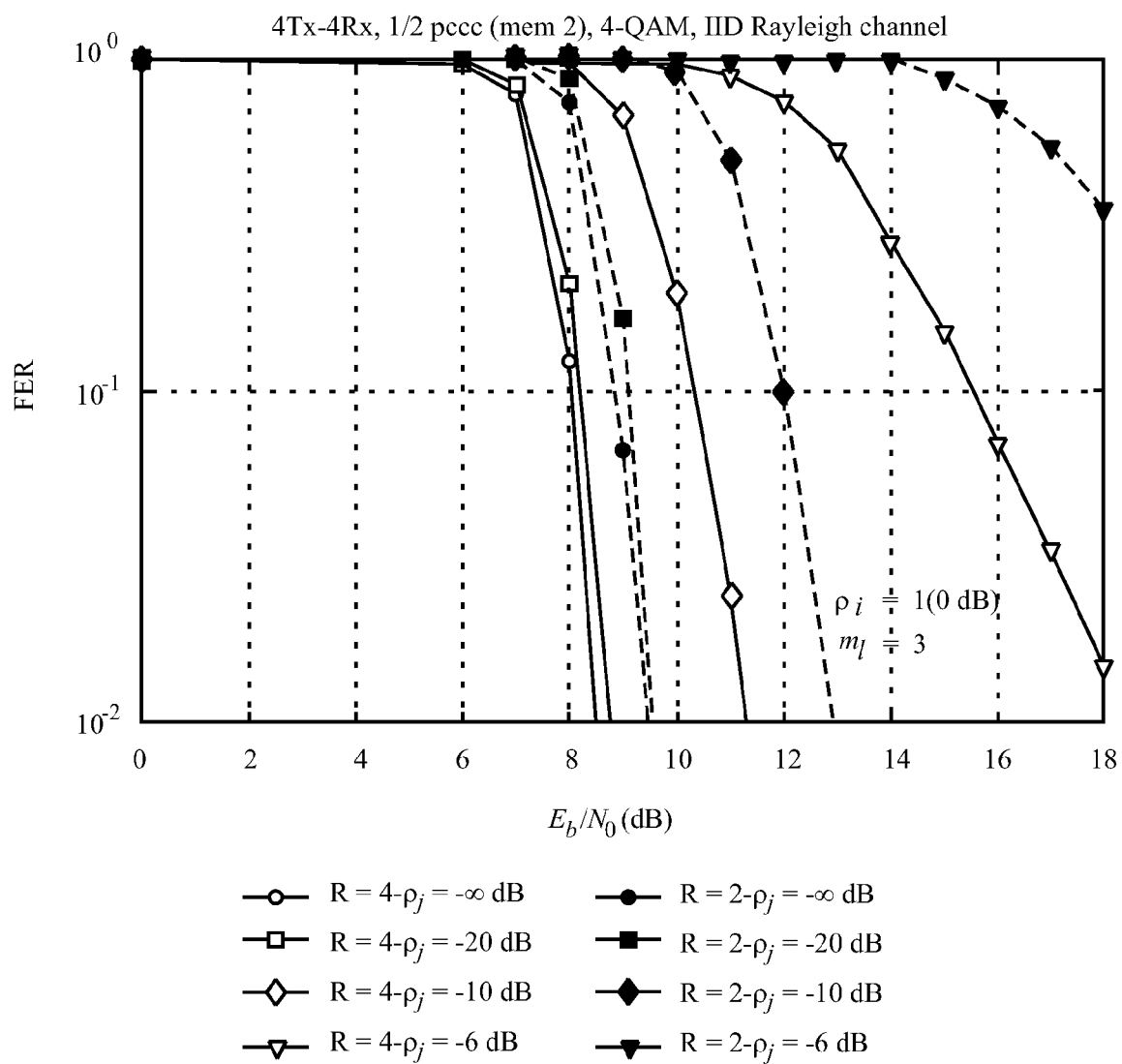
FIG. 15 is a graph showing FER for SAIC-DID in the presence of a weak interferer, in which $p_j$ represents the path loss of the weak interferer.

Finally, FIG. 15 shows the degradation in the performance of the receiver in the presence of additional weak interferes. As an example, a (2×2) cellular system is considered with three interferers. It is assumed that two interferers are strongly received ($m_i=3$) with the normalized path loss $p_i=1$ (0 dB), while the third one is a weak interferer whose normalized path loss $p_j$ can be varied. As illustrated, the performance deteriorates sharply if $p_j>-10$ dB. This is due to the fact that the product constellation of the three stronger streams is quite densely populated and any small additional noise may result in a large change in the demap-per output estimates, thereby making the decoder less effective. As to be expected, the schemes become more sensitive to this additional noise after quantization. With comparison to FIG. 11 (2×2, 0 dB curve), one can conclude that it is more beneficial for the considered scenario to jointly detect all four incoming signals if the normalized path loss for the weak interferer exceeds −10 dB.

FIG. 14 shows Backhaul traffic normalized with respect to total information bits. Single-bit quantization of LLR values is performed. Only those bits that have changed signs between iterations are exchanged ($p_i=0$ dB).

FIG. 15 shows FER for SAIC-DID in the presence of a weak interferer. $p_j$ represents the path loss of the weak interferer.

Figure 16:
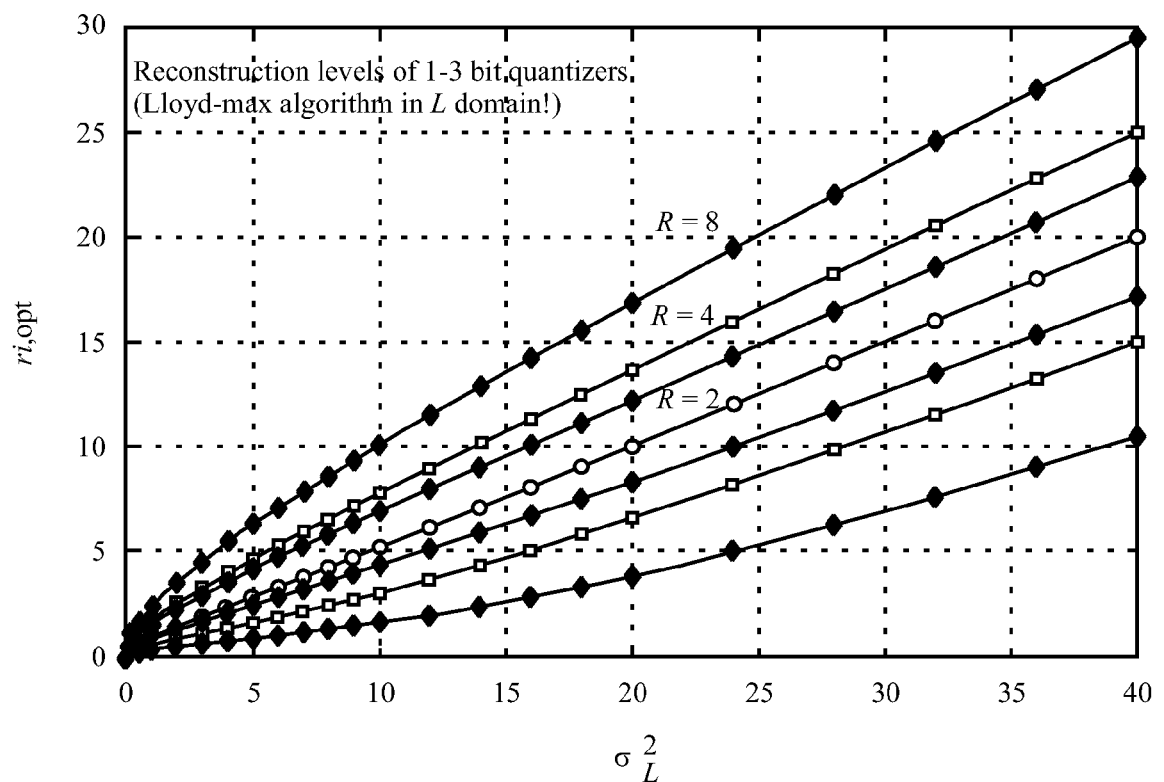
FIG. 16 is a graph showing optimum nonuniform quantization levels obtained by optimization in the L-value domain.

FIG. 16 shows optimum nonuniform quantization levels obtained by optimization in the L-value domain.

Figure 17:
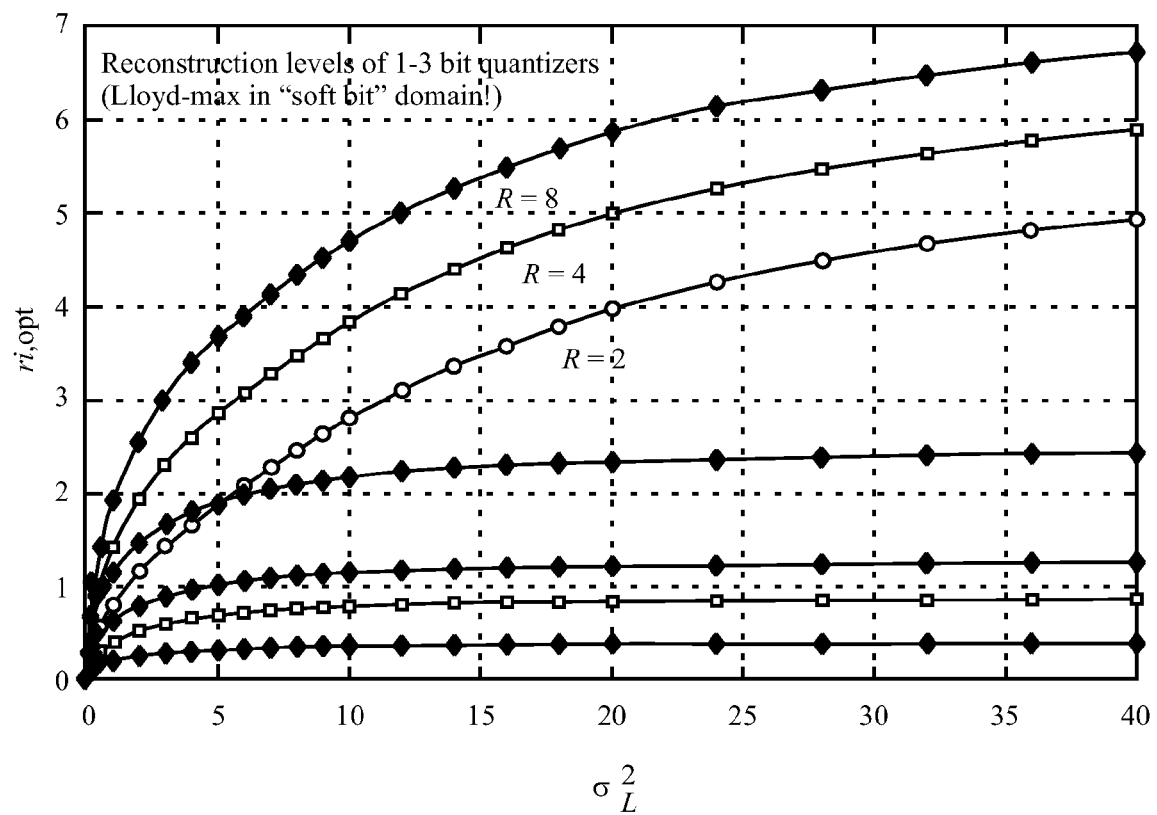
FIG. 17 is a graph showing optimum nonuniform quantization levels obtained by optimization in the "soft-bit" domain.

FIG. 17 shows optimum nonuniform quantization levels obtained by optimization in the "soft-bit" domain.

Figure 18:
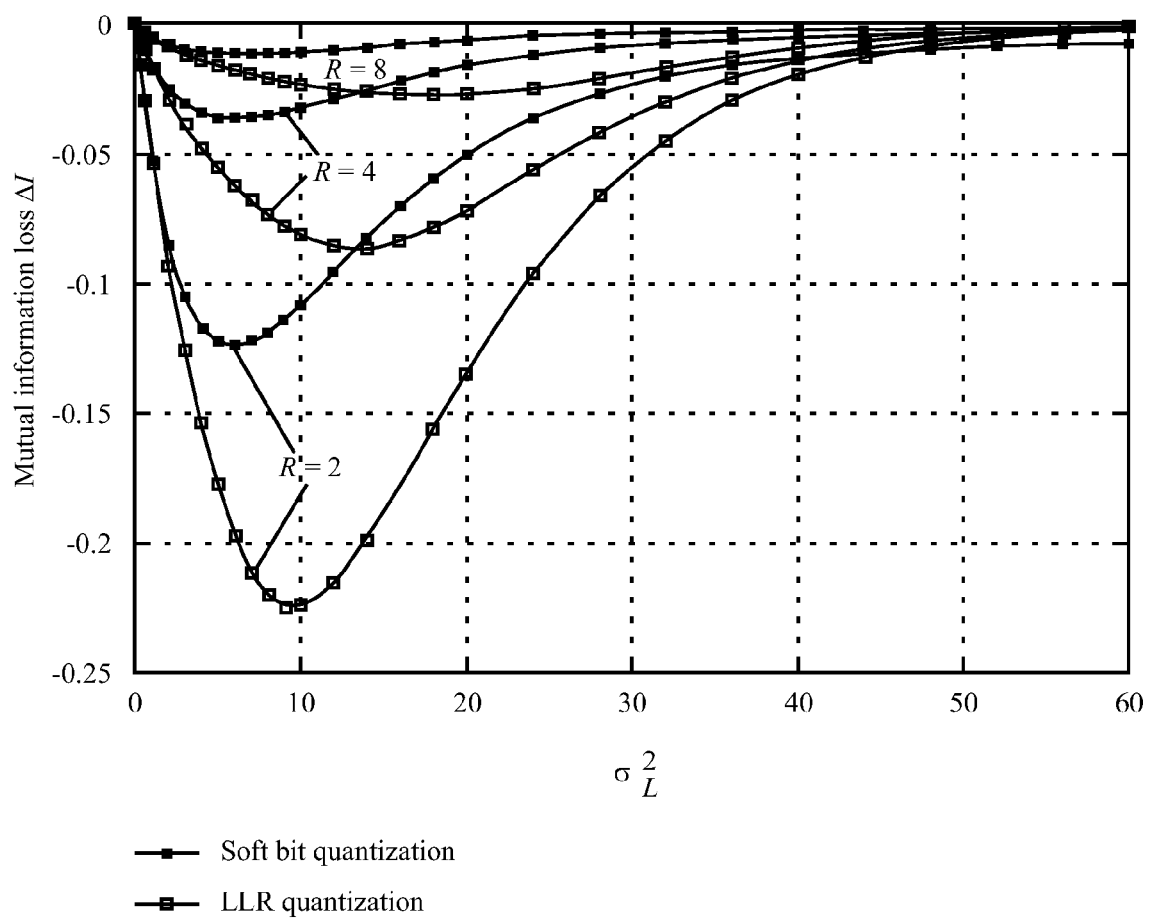
FIG. 18 is a graph showing mutual information loss $\Delta I(X; L)$ for 1-3 quantization bits as a function of the variance of the L-values.

FIG. 18 shows mutual information loss $\Delta I(X;L)$ for 1-3 quantization bits as a function of the variance of the L-values.

7. Conclusions

Outer cell interference in future cellular networks can be suppressed through base station cooperation.

Preferred exemplary embodiments of the invention include an alternative strategy to the distributed antenna system (DAS) for mitigating OCI which we termed as distributed iterative detection (DID). An interesting feature of this approach is the fact that no special centralized processing units are needed. In addition, we explored its implementation with reduced backhaul traffic by performing joint maximum likelihood detection for the desired user and the dominant interferers. We propose to exchange nonuniformly quantized soft bits to minimize the backhaul traffic. Interestingly, the quantization of reliability information does not result in a pronounced performance loss and sometimes even hard bits can be exchanged without undue degradation. To minimize backhaul it is further proposed that only those bits that have changed signs between iterations be exchanged. The result is a considerable reduction in backhaul traffic between base stations. The scheme is limited by (undetected) background interference.

An extension of this work could address the question under which conditions reliability information for more than one stream should be exchanged to obtain diversity and array gain and when this does not pay. This should provide some further insight into the tradeoff between capacity increase and affordable complexity.

Optimum Quantization of the L-Value Density

To optimize the reconstruction (quantization) levels $r_i$ and decision levels $d_i$ for a given density $p_L(X)$, we have to iteratively compute the integrals updating the reconstruction levels given the current decision levels $d_i$ (see (29)).

Consider first the bimodal Gaussian density of L-values given in (25). The integrals to be evaluated become (with $\mu_L=\rho_L^2/2$)

$$\int_{d_i}^{d_{i+1}} \exp\left\{-\frac{(x-\mu_L)^2}{2\sigma_L^2}\right\} + \exp\left\{-\frac{(x+\mu_L)^2}{2\sigma_L^2}\right\} dx =$$

$$\sigma_L\sqrt{\frac{\pi}{2}}\left[\text{erf}\frac{x-\mu_L}{\sqrt{2}\,\sigma_L^2} + \text{erf}\frac{x+\mu_L}{\sqrt{2}\,\sigma_L}\right]\Big|_{d_i}^{d_{i+1}},$$

$$\int_{d_i}^{d_{i+1}} x\exp\left\{-\frac{(x-\mu_L)^2}{2\sigma_L^2}\right\} + x\exp\left\{-\frac{(x+\mu_L)^2}{2\sigma_L^2}\right\} dx =$$

$$\sigma_L^2\left[\exp\left\{-\frac{(x-\mu_L)^2}{2\sigma_L^2}\right\} + \exp\left\{-\frac{(x+\mu_L)^2}{2\sigma_L^2}\right\}\right]\Big|_{d_i}^{d_{i+1}}$$

$$+\ldots+\mu_L\sigma_L\sqrt{\frac{\pi}{2}}\left[\text{erf}\frac{x-\mu_L}{\sqrt{2}\,\sigma_L} + \text{erf}\frac{x+\mu_L}{\sqrt{2}\,\sigma_L}\right]\Big|_{d_i}^{d_{i+1}},$$

The optimum positive quantization levels are displayed in FIG. 16 (the negative levels are obtained by inversion due to symmetry). As to be expected, for one quantization bit, the level equals the mean more or less exactly. With additional bits, the levels are placed on both sides around the mean. Similar integrals have to be evaluated to be quantized non-uniformly in the "soft-bit" domain. Here only one integral can be carried out:

$$\int_{d_i}^{d_{i+1}} p_L(\lambda)d\lambda = \frac{1}{2}\text{erf}\left[\frac{2\tanh^{-1}(\lambda)-\mu_L}{\sqrt{2}\,\sigma_L}\right]\Big|_{d_i}^{d_{i+1}}$$

with $p_L(\lambda)$ given by (26). The other integral $\int_{d_i}^{d_{i+1}} \lambda p_L(\lambda)d\lambda$ has to be evaluated by numerical integration. The derived optimum quantization levels converted back to the LLR domain with $L=2\tan h^{-1}(\lambda)$ are shown in FIG. 17.

We observe that now the optimized levels show some saturation with increasing mean/variance of the L-value density because the increase in reliability is not important. Rather it pays more to distinguish L-values of intermediate magnitude, say roughly in the range $2\leq l\leq 6$.

For practical evaluation, it is more convenient to determine the necessary quantizer resolution according to the variance of the L-values. We therefore provide a plot corresponding to FIG. 5 with a as the abscissa.

In many signal processing applications, concatenated modules exchange probabilities to perform certain tasks in a given signal processing chain or even do this iteratively to process the data. For digital processing, the signals are typically represented by bits in binary form and so-called log-likelihood ratios (abbreviated as LLRs or –values in the following) occur and have to be communicated with finite precision. The necessary quantization step inevitably causes quantization noise equivalent to information loss in the system.

The underlying idea is the intuitive consideration, that a (typically Gaussian) density to is more difficult to quantize than some transformed variable that shows saturation with increasing reliability (magnitude) of the –value. Based on a closed form expression for the transformed soft bit density that we had derived, Lloyd's optimum algorithm for scalar quantization could be conveniently applied to derive decision and reconstruction (quantization) levels and, respectively we also show that the loss of mutual information due to quantization was clearly smaller with soft bit based quantization than with "direct" quantization of the –value density.

Optimum levels in terms of mutual information loss were determined by maximizing the mutual information of the quantized value density by a steepest ascent technique. We alternatingly optimized the two level types in the spirit of Lloyd's algorithm for several iterations).

Example results are presented for reconstruction levels (4 finite decision levels; the decision levels and have the values independent of the method of quantization). Due to symmetry two level pairs occur for both reconstruction and decision levels which only differ in sign while the 5th reconstruction level is exactly zero independent of the value variance. Therefore only positive levels are shown as a function of comparing LLR and soft bit quantization with the scheme maximizing mutual information.

We note that the levels due to soft bit quantization show the expected saturation with increasing –value magnitude (increasing variance). This effect is less pronounced after maximizing the mutual information. Apart from optimizing the levels directly w.r.t. the nonlinear expression for the mutual information, a new degree of freedom that can be exploited with the latter scheme is the independent optimization of the decision levels which do not have to be the mean of the neighbouring reconstruction levels (corresponding to 1D-Voronoi regions, when viewed as a special case of vector quantization).

This allows reducing the loss in mutual information.

We note a relatively large reduction of the mutual information loss (decreasing with increasing number of levels), when the LLR-based quantization is replaced by the maximization of the mutual information.

The comparison between the soft bit quantisation and the mutual information maximization shows that with soft bits a large portion of the loss can already be avoided, although still up to ¼ of this loss can be saved with the separate optimization of the decision levels. Here the case is special, because this degree of freedom is not yet available, so that both schemes are equivalent.

For hardware implementation a look-up table with interpolation could be used. More practical, however, is to use curve fitting based on an appropriate approximating function. In this case an expansion in terms of works well.

Another observation concerns the probabilities with which different quantization levels are used: while quantization of the LLR density with the Lloyd-Max algorithm leads to more or less uniformly used levels, L-value quantization based on mutual information or soft bits causes significant differences in probability.

This can be exploited with a well-known technique referred to as entropy coding that assigns quantization labels of different length using a prefix-free code either to the individual levels or to groups of them, if several –values are represented jointly. A lower bound for the required average label length is given by the entropy of the quantization levels.

We compare this bound for LLR quantization based on mutual information and the Lloyd-Max algorithm applied to the L-value density. In addition we computed the practically achievable rate reduction using Huffman coding in three dimensions. This corresponds to the staircase functions lying above the bounding entropy curves.

As a test case for the proposed LLR quantization scheme we studied decoding of a parallel concatenated convolutional code (PCCC). The extrinsic information obtained from the decoder output with the BCJR algorithm (applying the max. Log-MAP approximation) was exchanged either after direct LLR quantization, soft bit quantization or quantization based on maximizing the mutual information for 2, 3, 4, 8 levels by the two companion decoders. As a reference the unquantized representation of the a-priori information was taken. We used a simple recursive systematic PCCC with generators block length with a random interleaver punctured to obtain rate ½.

The variance of the LLRs was adaptively determined at the MAP decoder output from the observed variance of, the LLR of the code bits. The fitting functions were used to obtain the new quantization levels in each decoder iteration. For variances larger than the levels for that value were taken and the current –value distribution was scaled accordingly to maintain the information about the relative magnitude among the –values (one could stop iterating here, too). The findings here can be compared with the observations in [P. Robertson, P. Hoeher, and E. Villebrun, "Optimal and sub-optimal maximum a posteriori algorithms suitable for turbo decoding," *Eur. Trans. Telecommun.*, vol. 8, pp. 119-125, 1997], where quantization of all involved quantities in the Log-MAP algorithm was studied. The results for LLR quantization in the upper plot are markedly worse than the other two schemes, because quantization levels are wasted at large –value magnitude. In the lower plot the soft bit quantization (dashed lines) is slightly worse than the mutual information based techniques.

Distinguishing three quantization schemes, we showed that a significant gain is possible, if LLR values are not quantized "directly" with the Lloyd-Max algorithm. Rather soft bits or even slightly better mutual information provide better cost functions. We quantified this with the loss in mutual information, demonstrating the improvement with a turbo decoding example. Although the proposed scheme strictly applies only to Gaussian channels, it should also be of interest for coded transmission over fading channels, if a Gaussian approximation for the –value density at the decoder output is applicable. An extension from scalar to vector quantization is feasible by generalizing vectors.

According to a preferred exemplary embodiment of the method, the communication system, the logical node and the mobile user equipment quantized Lvalues are exchanged for which the optimum quantization and decision levels have been obtained based on the density of the associated 'soft-bit' values and not on the density of the L-values.

According to a further preferred exemplary embodiment of the method, the communication system, the logical node and the mobile user equipment the average amount of mutual information communicated with the proposed quantization scheme is increased with respect to 'direct' quantization of the L-value density.

According to a further preferred exemplary embodiment of the method, the communication system, the logical node and the mobile user equipment the used levels vary with mean and variance of the currently to be transmitted block of L-values. The currently used levels can be stored in advance at the transmitter and receiver side of the quantized communication link, so that at the beginning of the exchange of quantized L-values only the current absolute mean value has to be reliably communicated to correctly interpret the transmitted indices for the levels.

According to yet another exemplary embodiment of the method, the communication system, the logical node and the mobile user equipment that the data rate required for the exchange of quantized L-values is estimated by exploiting the fact that the used quantization levels differ strongly in their respective probabilities. Thus, the levels can represented with a technique called 'entropy coding' and prefix-free codes using labels of different length.

Application examples are:
- Cooperating base stations jointly but non-locally detecting data from several mobile terminals
- Hardware implementations of modules such as probability decoders used for decoding concatenated codes, where L-values have to be exchanged between devices (leading to a trade-off between performance and complexity at an acceptable data rate).

As set forth herein, an exemplary embodiment of the present invention improves multi-user detection through an effective base station cooperation.

Base stations situated at different geographical locations are utilized for an effective data exchange, thus resulting backhaul traffic.

APPENDIX OF REFERENCES

[1] J. G. Andrews, "Interference cancellation for cellular systems: a contemporary overview," IEEE Wireless Communications, vol. 12, no. 2, pp. 19-29, 2005.

[2] H. Dai, A. F. Molisch, and H. V. Poor, "Downlink capacity of interference-limited MIMO system with joint detection," IEEE Transactions on Wireless Communications, vol. 3, no. 2, pp. 442-453, 2004.

[3] J. G. Proakis, Digital Communication, McGraw-Hill, New York, N.Y., USA, 4th edition, 2001.

[4] S. Verdu, "Demodulation in the presence of multi-user interference: progress and misconceptions," in Intelligent Methods in Signal Processing and Communications, pp. 15-44, Birkhauser Boston, Cambridge, Mass., USA, 1997.

[5] R. Lupas and S. Verdu, "Linear multi-user detectors for synchronous code-division multiple-access channels," IEEE Transactions on Information Theory, vol. 35, no. 1, pp. 123-136, 1989.

[6] U. Madhow and M. L. Honig, "MMSE interference suppression for direct-sequence spread-spectrum CDMA," IEEE Transactions on Communications, vol. 42, no. 12, pp. 3178-3188, 1994.

[7] D. Seethaler, G. Matz, and F. Hlawatsch, "An efficient MMSE-based demodulator for MIMO bit-interleaved coded modulation," in Proceedings of IEEE Global Telecommunications Conference (GLOBECOM '04), vol. 4, pp. 2455-2459, Dallas, Tex., USA, November-December 2004.

[8] P. D. Alexander, M. C. Reed, J. A. Asenstorfer, and C. B. Schlegel, "Iterative multi-user interference reduction: turbo CDMA," IEEE Transactions on Communications, vol. 47, no. 7, pp. 1008-1014, 1999.

[9] B. Lu and X. Wang, "Iterative receivers for multi-user space-time coding systems," IEEE Journal on Selected Areas in Communications, vol. 18, no. 11, pp. 2322-2335, 2000.

[10] H. Lee, B. Lee, and I. Lee, "Iterative detection and decoding with an improved VBLAST for MIMO-OFDM systems," IEEE Journal on Selected Areas in Communications, vol. 24, no. 3, pp. 504-513, 2006.

[11] A. D. Wyner, "Shannon-theoretic approach to a Gaussian cellular multiple-access channel," IEEE Transactions on Information Theory, vol. 40, no. 6, pp. 1713-1727, 1994.

[12] S. Shamai and A. D. Wyner, "Information-theoretic considerations for symmetric, cellular, multiple-access fading channels. I," IEEE Transactions on Information Theory, vol. 43, no. 6, pp. 1877-1894, 1997.

[13] W. Choi, J. G. Andrews, and C. Yi, "Capacity of multi-cellular distributed antenna networks," in Proceedings of the International Conference on Wireless Networks, Communications and Mobile Computing (WIRLES '04), vol. 2, pp. 1337-1342, Maui, Hi., USA, June 2005.

[14] A. Grant, S. Hanly, J. Evans, and R. Muller, "Distributed decoding for Wyner cellular systems," in Proceedings 5th Australian Communications Theory Workshop (AusCTW '04), pp. 77-81, Newcastle, Australia, February 2004.

[15] E. Aktas, J. Evans, and S. Hanly, "Distributed decoding in a cellular multiple-access channel," in Proceedings of the IEEE International Symposium on Information Theory (ISIT '04), p. 484, Chicago, Ill., USA, June-July 2004.

E. Aktas, J. Evans, and S. Hanly, "Distributed base station processing in the uplink of cellular networks," in Proceedings of IEEE International Conference on Communications (ICC '06), vol. 4, pp. 1641-1646, Istanbul, Turkey, June 2006.

[17] O. Shental, A. J. Weiss, N. Shental, and Y. Weiss, "Generalized belief propagation receiver for near-optimal detection of two-dimensional channels with memory," in Proceedings of the IEEE Information Theory Workshop (ITW '04), pp. 225-229, San Antonio, Tex., USA, October 2004.

[18] A. Sklavos and T. Weber, "Interference suppression in multi-user OFDM systems by antenna diversity and joint detection," in Proceedings of the COST 273 Management Committee Meeting (MCM '01), Bologna, Italy, October 2001, TD(01)020.

[19] S. Khattak, W. Rave, and G. Fettweis, "SIC based multi-user turbo detection in a distributed antenna system for non gray mapping," in Proceedings of the 9th International Symposium on Wireless Personal Multimedia Communications (WPMC '06), San Diego, Calif., USA, September 2006.

[20] W. Roh and A. S. Paulraj, "MIMO channel capacity for the distributed antenna systems," in Proceedings of the IEEE 56th Vehicular Technology Conference (VTC '02), vol. 2, pp. 706-709, Vancouver, BC, Canada, September 2002.

[21] S. Verdu, Multi-user Detection, Cambridge University Press, Cambridge, UK, 1998.

[22] P. Marsch and G. Fettweis, "A framework for optimizing the uplink performance of distributed antenna systems under a constrained backhaul," in Proceedings of the IEEE 5 International Conference on Communications (ICC '07), pp. 975-979, Glasgow, Scotland, June 2007.

[23] A. Sanderovich, O. Somekh, and S. Shamai, "Uplink macro diversity with limited backhaul capacity," in Proceedings of the IEEE International Symposium on Information Theory (ISIT '07), Nice, France, June 2007.

[24] S. Khattak and G. Fettweis, "Distributed iterative detection in an interference limited cellular network," in Proceeding of the 65th IEEE Vehicular Technology Conference (VTC '07), pp. 2349-2353, Dublin, Ireland, April 2007.

[25] T. Weber, A. Ahrens, and S. Deng, "Decentralized interference cancellation in mobile radio networks," in Proceedings of the IEEE Wireless Communications and Networking Conference (WCNC '07), pp. 2190-2194, Kowloon, China, March 2007.

[26] V. Kuhn, "Combined MMSE-PIC in coded OFDM-CDMA systems," in Proceedings of Conference IEEE Global Telecom-munications Conference (GLOBECOM '01), vol. 1, pp. 231-235, San Antonio, Tex., USA, November 2001.

[27] H. Zhang, N. B. Mehta, A. F. Molisch, J. Zhange, and H. Dai, "Joint transmission by cooperative base stations in multi-user MIMO cellular downlinks with asynchronous interference," *IEEE Transactions on Wireless Communications*, vol. 7, no. 1, 2008.

[28] J. Hagenauer, E. Offer, and L. Papke, "Iterative decoding of binary block and convolutional codes," *IEEE Transactions on Information Theory*, vol. 42, no. 2, pp. 429-445, 1996.

[29] E. Zimmermann, S. Bittner, and G. Fettweis, "Complexity re-ductioniniterative MIMO receivers based on EXIT chart analysis," in *Proceedings of the 4th International Symposium on Turbo Codes & Related Topics (ISTC '06)*, Munchen, Germany, April 2006.

[30] B. M. Hochwald and S. ten Brink, "Achieving near-capacity on a multiple-antenna channel," *IEEE Transactions on Communications*, vol. 51, no. 3, pp. 389-399, 2003.

[31] W.-J. Choi, K.-W. Cheong, and J. M. Cioffi, "Iterative soft interference cancellation for multiple antenna systems," in *Proceedings of the IEEE Wireless Communications and Networking Conference (WCNC '00)*, vol. 1, pp. 304-309, Chicago, Ill., USA, September 2000.

[32] S. Lloyd, "Least squares quantization in PCM," *IEEE Transactions on Information Theory*, vol. 28, no. 2, part 1, pp. 129-137, 1982.

[33] J. Max, "Quantizing for minimum distortion," *IEEE Transactions on Information Theory*, vol. 6, no. 1, pp. 7-12, 1960.

[34] T. M. Cover and J. A. Thomas, Elements of Information Theory, John Wiley & Sons, New York, N.Y., USA, 1991.

[35] I. Land, P. A. Hoeher, and S. Gligorevic, "Computation of symbol-wise mutual information in transmission systems with LogAPP decoders and application to Exit charts," in *Proceedings of the 5th International ITG Conference on Source and Channel Coding (SCC '04)*, pp. 195-202, Erlangen, Germany, January 2004.

[36] J. Hagenauer, "The Exit chart," in *Proceedings of the 12th European Signal Processing Conference (EUSIPCO '04)*, pp. 1541-1548, Vienna, Austria, September 2004.

[37] S. ten Brink, "Convergence behavior of iteratively decoded parallel concatenated codes," *IEEE Transactions on Communications*, vol. 49, no. 10, pp. 1727-1737, 2001.

[38] S. Golomb, "Run-length encodings," *IEEE Transactions on Information Theory*, vol. 12, no. 3, pp. 399-401, 1966.

[39] A. Gersho and R. M. Gray, *Vector Quantization and Signal Compression*, Kluwer Academic Publishers, Boston, Mass., USA, 1992.

What is claimed is:

1. A method for multi-user detection by a plurality of base stations situated at different geographical locations through base station cooperation, the method comprising exchanging detected data iteratively among the base stations while performing separate detection and decoding of received data streams, wherein the detected data is based on processed information relating to associated mobile terminals between the base stations, and wherein the detected data comprises L-values for which optimum quantization and decision levels have been obtained based on a transformed variable showing saturation with increasing reliability.

2. The method recited in claim 1, comprising exchanging only processed information relating to associated mobile terminals between the base stations.

3. The method recited in claim 1, comprising calculating local estimates of dominant interferers of at least two base stations.

4. The method recited in claim 3, comprising combining local estimates of dominant interferers of a first subset of the plurality of base stations with independently received copies from a second subset of the plurality of base stations.

5. The method recited in claim 4, wherein the first subset of the plurality of base stations comprises most of the plurality of base stations.

6. The method recited in claim 3, comprising combining the local estimates for the at least two base stations with their independently received copies from other ones of the plurality of base stations.

7. The method recited in claim 1, comprising:
calculating local estimates of dominant interferers of the plurality of base stations; and
combining the local estimates with independently received copies from at least some of the plurality of base stations.

8. The method recited in claim 1, comprising generating local estimates of dominant interferers at each of the plurality of base stations using single-antenna interference cancellation techniques.

9. The method recited in claim 1, wherein the transformed variable showing saturation with increasing reliability is a soft-bit density presentation of the L-values.

10. The method recited in claim 9, wherein only soft-bits that have changed signs between iterations are exchanged.

11. The method recited in claim 1, wherein the transformed variable showing saturation with increasing reliability is a mutual information presentation of the L-values.

12. The method recited in claim 1, wherein used levels vary with mean and variance of a currently to be transmitted block of L-values.

13. The method recited in claim 1, comprising estimating a data rate required for the exchange of quantized L-values by exploiting the fact that used quantization levels differ strongly in their respective probabilities, wherein the levels can represented with an entropy coding technique and prefix-free codes using labels of different length.

14. The method recited in claim 1, wherein the optimum quantization comprises nonuniform quantization minimizing mean square quantization error.

15. A communication system that is adapted to carry out communication between a plurality of communication devices situated at different geographical locations, each of the communication devices being adapted to exchange detected data iteratively among the plurality of base stations while performing separate detection and decoding of received data streams, whereby the exchanged detected data is based on processed information relating to associated mobile terminals between the base stations and the exchanged detected data comprises L-values for which optimum quantization and decision levels have been obtained based on a transformed variable showing saturation with increasing reliability.

16. The communication system recited in claim 15, wherein each of the communication devices comprises a logical node.

* * * * *